United States Patent [19]

Mizutani et al.

[11] Patent Number: 4,796,052

[45] Date of Patent: Jan. 3, 1989

[54] ELECTROPHOTOGRAPHIC COPYING MACHINE HAVING AN EDITORIAL FUNCTION

[75] Inventors: Taketomo Mizutani; Kenhachi Shiraki; Michihiko Hasegawa; Yujiro Koumoto; Yoshihiro Tanimoto; Masayuki Tanaka; Fumizo Kimoto; Fumihiko Hamada, all of Hyogo, Japan

[73] Assignee: Sanyo Electric Co., Ltd., Japan

[21] Appl. No.: 17,811

[22] Filed: Feb. 20, 1987

[30] Foreign Application Priority Data

| | | | |
|---|---|---|---|
| Feb. 20, 1986 | [JP] | Japan | 61-35658 |
| May 7, 1986 | [JP] | Japan | 61-104271 |
| May 13, 1986 | [JP] | Japan | 61-71503 |
| May 16, 1986 | [JP] | Japan | 61-113102 |
| May 16, 1986 | [JP] | Japan | 61-113103 |
| May 28, 1986 | [JP] | Japan | 61-122535 |
| May 29, 1986 | [JP] | Japan | 61-125320 |

[51] Int. Cl.[4] .................. G03B 15/00

[52] U.S. Cl. .................. 355/7

[58] Field of Search .................. 355/7, 14 R, 14 C, 40, 355/75; 178/18, 19; 340/710

[56] References Cited

U.S. PATENT DOCUMENTS

| | | | |
|---|---|---|---|
| 4,514,726 | 4/1985 | Whetstone et al. | 340/710 |
| 4,626,925 | 12/1986 | Toyoda | 355/7 X |

FOREIGN PATENT DOCUMENTS

| | | | |
|---|---|---|---|
| 56-165153 | 12/1981 | Japan | 355/14 R |
| 59-87466 | 5/1984 | Japan . | |
| 59-88754 | 5/1984 | Japan . | |

*Primary Examiner*—Arthur T. Grimley
*Assistant Examiner*—J. Pendegrass
*Attorney, Agent, or Firm*—Darby & Darby

[57] ABSTRACT

An electrophotographic copying machine comprises a mouse which is connected to a main unit by a connecting cord and is for inputting positional information for editing. The mouse has a roller whose peripheral side surface is exposed from a case. When the mouse is moved while the peripheral side surface of the roller is brought in contact with a surface of an original, pulses are generated from the mouse attending on rotation of the roller, and these pulses are counted by a counter of a microcomputer. The counted value of the counter is utilized as positional data for editing by the microcomputer. Based on that positional data, the microcomputer partially and selectively lightens of a plurality of LED elements constituting a LED array. Therefore, an electrostatic latent image on a photoreceptor-drum is partially erased so that "masking" or "trimming" of an image in an area defined by the positional data is executed. When the timing of transfer of a toner image is controlled by the microcomputer based on the positional data, "moving" of the image is performed.

22 Claims, 22 Drawing Sheets

ELECTROPHOTOGRAPHIC COPYING MACHINE HAVING AN EDITORIAL FUNCTION

BACKGROUND OF THE INVENTION

1. Field of the Invention

The present invention relates to an electrophotographic copying machine having an editorial function. More specifically, the present invention relates to an electrophotographic copying machine which forms an electrostatic latent image on a photoreceptor by scanning an original and performs image editing such as "masking", "trimming", "moving" or similar image editing.

2. Description of the Prior Art

For the electrophotographic copying machines capable of image editing, two types machines are known in a rough classification. A first one is disclosed, for example, in the Japanese Patent-Laid Open No. 87,470/1984 laid open on May 22, 1984. In this first prior art, an original is put on an editor board for image editing and a position on the original surface is specified by an inputting pen for "trimming", "masking" or the like, and thereafter the original is moved and put on to an original table to execute a copying processing.

A second one is disclosed in the Japanese Patent Laid-Open No. 10,771/1983 laid open on Jan. 21, 1983. In this second prior art, an original is put on an original table while facing upward, coordinates on a surface of the original to be edited are detected and entered by means of keys, and thereafter the original is turned over and the copying processing is executed.

In the first prior art, an apparatus dedicated to editing such as the editor board is required and therefore it costs higher and has a disadvantage in space saving.

In the second prior art, coordinates on the surface of the original are read and the coordinate data is specified through keys, and therefore operation is very troublesome.

SUMMARY OF THE INVENTION

Therefore, a principal object of the present invention is to provide a novel electrophotographic copying machine having an editorial function.

Another object of the present invention is to provide a smaller-sized and more economical electrophotographic copying machine having an editorial function.

Still another object of the present invention is to provide an electrophotographic copying machine having an editorial function in which the position for editing can be specified by a simple operation.

The other object of the present invention is to provide an electrophotographic copying machine having an editorial function which employs position specifying means such as a mouse.

An electrophotographic copying machine having an editorial function in accordance with the present invention comprises position specifying means which is moved while contacting with a surface of an original to specify position or positions on the surface of the original to be edited, and image forming means for forming a copied image which is edited according to positional data based on an amount of movement of the position specifying means.

An original is put, for example, on an original table while facing upward so that the surface of the original can be seen. The position specifying means is moved while brought in contact with the surface of the original, and thereby the position of the original to be edited, for example, the portion or area of the original surface to be edited is specified. Then, the position specifying means generates data of the amount of movement thereof, that is, positional data according to the amount of movement thereof. Thereafter, the original is turned over so that the surface of the original to be copied will face downward, being put on the original table. Then, by operating a start key, a copied image which is edited ("masking", "trimming", "moving", "centering" or similar image editing) according to the positional data from the position specifying means is formed by the image forming means.

In accordance with the present invention, the position or positions for editing can be specified by the position specifying means which moves while contacting with the surface of the original, and therefore, unlike the abovedescribed first prior art, the editor board or the like can be dispensed with. For this reason, in accordance with the present invention, a smaller-sized and more economical electrophotographic copying machine having an editorial function is obtainable.

Also, in accordance with the present invention, the position or positions of the original to be edited can be specified only by moving the position specifying means on the original by operating by hand, and therefore, in comparison with key-entering in the above-described second prior art, the operation for specifying the position for editing is very simple.

The above described objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
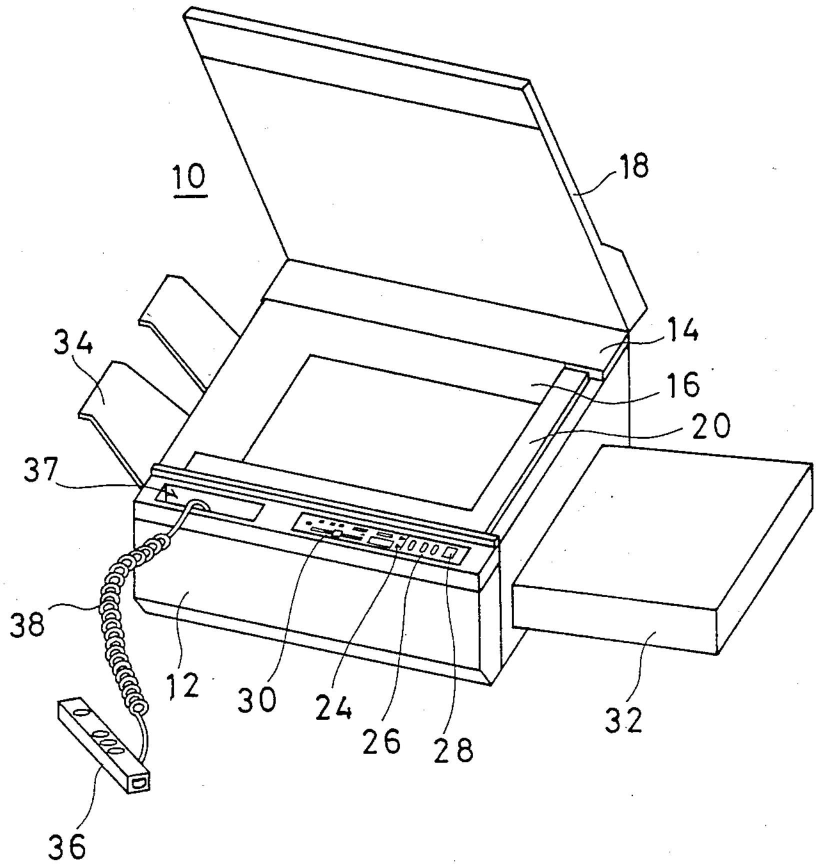
FIG. 1 is a whole appearance view showing one example of an electrophotographic copying machine having an editorial function as one embodiment in accordance with the present invention.

FIG. 1 is a whole appearance view of an electrophotographic copying machine having an editorial function as one embodiment in accordance with the present invention. An electrophotographic copying machine 10 comprises a main unit 12, and an original table 14 is installed on the top surface of this main unit 12. The original table 14 is supported by the main unit 12 movably to right and left. The original table 14 comprises, for example, a transparent glass plate 16, and thereon an original table cover 18 is mounted in a manner capable of opening upward and closing. On the rectangular transparent glass plate 16, an L-shaped positioning plate 20 is provided for positioning so that an original can be put along two sides of this glass plate 16.

An operation panel 24 is formed at this side of the top surface of the main unit 12. As shown in detail in FIG. 12, a group of keys 26, a start key 28 and a display panel 30 are formed on this operation panel 24. The group of keys 26 is utilized for setting copy quantity in a copying mode, and is utilized for specifying "trimming" or "masking" in an editing mode or for releasing these specifyings. To be detailed, in the copying mode, setting of the copy quantity is performed through a key 26*a* and a key 26*b*, and the set copy quantity is released by a key 26*c*. The number of tens of the copy quantity is set by the key 26i a and the number of units is set by the key 26*b*. In the copying mode, these keys 26*a* and 26*b* operate as toggle keys whereby the copy quantity which is set responding to the depressed number is increased in sequence. The key 26*c* is clear-stop key for releasing the copy quantity set through the keys 26*a* and 26*b*, and for stopping copying operation in the copying operation.

In the editing mode, the keys 26*a* and 26*b* operate as keys for specifying either of "trimming" and "masking". Also, in the editing mode, the key 26*c* operates as an operating key for releasing the specified "trimming", "masking" or "moving". In the editing mode, the start key 28 operates as a setting key for setting positional data for "trimming", "masking", "moving".

On the right end of the display panel 30, LEDs 30*a* and 30*b* are provided so as to show the mode set at that time by lighting them. When the LED 30*a* is lightened, the copying machine in the copying mode, and when the lightening is changed to the LED 30*b*, the copying machine is in the editing mode.

On the upper portion of the display panel 30*a*. a plurality of indicators are formed, which indicate the states of the copying machine, for example, a lack of toner, etc. A segmental display 31 is formed under the indicator indicating the state capable of copying, that is, "READY". This segmental display 31 displays the set copy quantity in the copying mode, and as described later, in the editing mode, displays the position of coordinates and the specified state and the like specified up to that time by the position of the lightened segment.

At one end of the main unit 12, a paper feeding part is formed, in which a paper feed cassette 32 is loaded in a attachable/detachable fashion, and at the other end thereof, a paper discharging part comprising a copy receiving tray 34 is formed.

On the left side of the display panel 30, a recession 37 is formed into which a mouse 36 for specifying the position for editing is put. The mouse 36 is connected to the main unit 12 through a curled cord 38 which is drawn out, for example, from the bottom part of the recession 37.

As described later, position specifying on the surface of the original for editing is performed by moving the mouse 36 on the surface of the original in the state that the original is put, for example, on a flat surface of the original table 14, on the original table cover 18 or on a separate desk so that the surface of the original faces upward. Then, the original 40 having finished position specifying for editing by the mouse 36 is turned over so that the surface of the original faces downward, being put on the transparent glass plate 16 as shown in FIG. 1.

When the original table cover 18 is closed and thereafter the start key 28 is operated in that state, the edited copy image is recorded on a copy paper fed from the paper feed cassette 32, being discharged onto the copy receiving tray 34.

Figure 2:
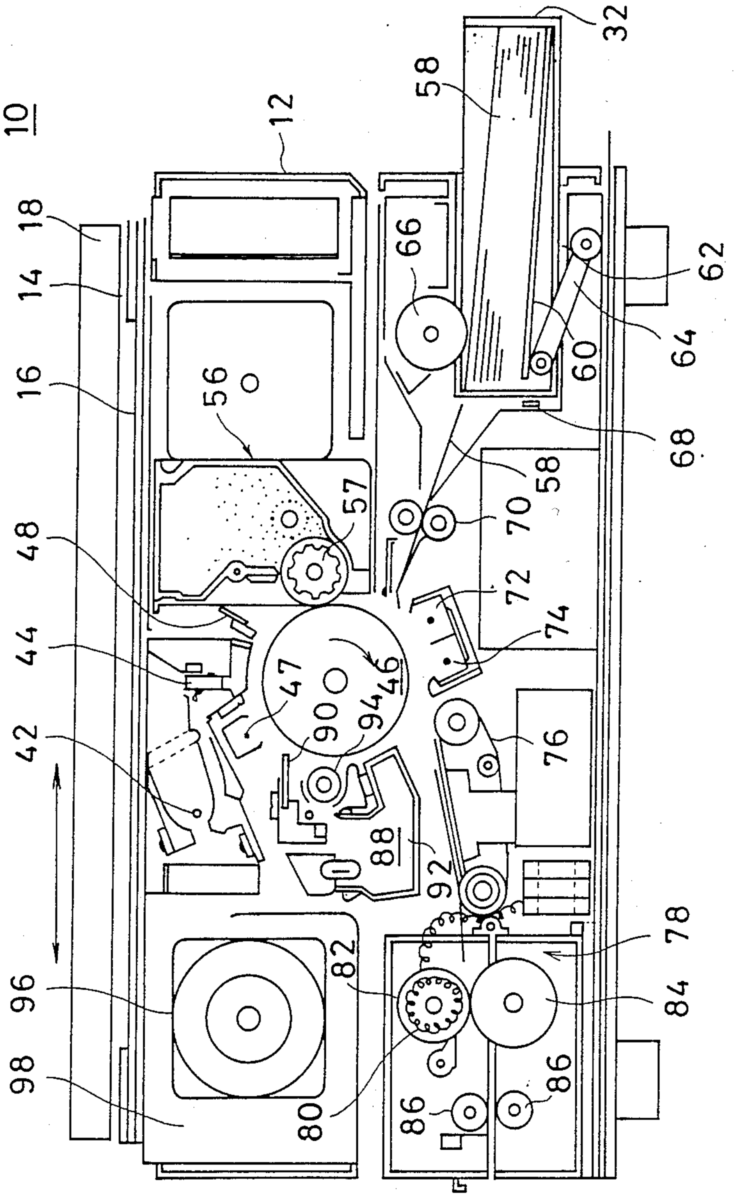
FIG. 2 is an illustrative cross-sectional view showing an inner structure of FIG. 1 embodiment.

Next, detailed description is made on an inner structure of the electrophotographic copying machine 10 in reference to FIG. 2. As described above, the original table 14 comprising the transparent glass plate 16 and the original table cover 18 are mounted on the top surface of the main unit 12 in a manner capable of opening and closing. A slit is formed on the top surface of this main unit 12, that is, under the transparent glass plate 16. Associated with this slit, a light source 42, for example, a halogen lamp is installed in a fixed fashion in the main unit 12. Associated with the light source 42, a reflecting mirror having an elliptic cross-section is installed. Light from the light source 42 is reflected by the reflecting mirror, being irradiated onto the original 40 put on the transparent glass plate 16. Accordingly, the original 40 receives the light from the light source 42 through the above-described slit and reflects the same responding to the movement of the original table 14 in the direction shown by an arrow. The light reflected from the original 40 is projected to form the original image on a photoreceptor-drum 46 through a short focal distance lens array 44. This short focal distance lens array 44 is composed of a convergent light transmitting unit in which a number of rod lenses are closely arranged. In addition, needless to say, such a short focal distance lens array 44 may be replaced by another plastic lens array or convex lens.

The photoreceptor-drum 46 is disposed nearly at the center of the main unit 12, and is rotated in the direction shown by an arrow (clockwise) by a main motor 96 as driving source in synchronism with the movement of the original table 14. This photoreceptor-drum 46 comprises a conductive substrate and a photoconductive layer consisting of amorphous silicon or the like which is formed thereon in a laminated fashion.

At the upstream side from the short focal distance lens array 44 in the direction of rotation of the photoreceptordrum 46, a charging corotron 47 for uniformly charging the photoreceptor-drum 46 in the positive polarity (about 600 V) is fixedly mounted. An electrostatic latent image of the original is formed on the photoreceptor-drum 46 by the charging corotron 47, the light source 42, the short focal distance lens array 44 and the original 40 put on the original table 14.

At the downstream side from the short focal distance lens array 44 in the vicinity of the peripheral side surface of the photoreceptor-drum 46, a partial erasure lamp, that is, an LED array 48 is installed which partly erases a useless electrostatic latent image based on a signal from the above described mouse 36 (refer to FIG. 1).

At the downstream side from the LED array 48, a developing device 56 for developing the electrostatic latent image by toner is installed. A mixture of toner and carriers are accommodated in the developing device 56. This mixture is made to fly toward the photoreceptor-drum 46 by a magnet roller 57. At this time, an ear of the mixture is formed at the portion of the magnet roller 57 opposite to the photoreceptor-drum 46. This ear contacts with the photoreceptor-drum 46, and thereby the toner charged in the negative polarity adheres to the electrostatic latent image formed by positive charges. Thus, the electrostatic latent image formed on the photoreceptor-drum 46 is developed as a toner image by the developing device 56.

Copy papers 58 are accommodated in a stack fashion in the paper feed cassette 32 loaded in one end of the main unit 12 in a manner capable of inserting and removing. At the bottom part of the paper feed cassette 32, a supporting plate 60 for placing the copy paper 58 thereon is installed in a manner capable of swinging up and down. An opening 62 is formed at the lower part of the supporting plate 60. A free end of a push-up lever 64 whose base end is attached to the inner bottom part of the main unit 12 in a manner capable of swinging is inserted into this opening 62. Associated with this push-up lever 64, a spring for rotation-energizing the push-up lever 64 clockwise is installed (not illustrated). The supporting lever 60 is pushed upward by this push-up lever 64. Accordingly, the copy papers 58 accommodated in the paper feed cassette 32 is pushed up by the push-up lever 64, and the uppermost copy paper 58 is brought in contact with a paper feed roller 66 to be picked up. In addition, associated with the paper feed cassette 32, a paper size detector 68 is installed as required.

A register roller 70 is provided behind the paper feed roller 66. The copy paper 58 fed from the paper feed cassette 32 is stopped once by this register roller 70, there-after being fed toward the photoreceptor-drum 46 in synchronism with the movement of the original table 14.

At the position in the vicinity of the peripheral side surface of the photoreceptor-drum 46 to which the copy paper 58 is fed from the register roller 70, a transferring corotron 72 for transferring the toner image developed by the developing device 56 onto the copy paper 58 is installed. A separating corotron 74 is installed in association with this transferring corotron 72. The separating corotron 74 neutralizes the charges on the copy paper 58 after transferring by applying AC corona discharge thereto to prevent the copy paper 58 on which the toner image formed on the photoreceptor-drum 46 has been transferred from being absorbed by the charges remaining on the photoreceptor-drum 46.

At the downstream side from the separating corotron 74, a vacuum conveyor 76 for transferring the copy paper 58 on which the toner image is transferred toward a fixing device 78 by this vacuum conveyor 76.

The fixing device 78 is constituted with a heating roller 82 incorporating a heater 80 and a pressing roller 84 in pressure contact with the heating roller 82. The copy paper 58 on which the toner image is transferred is inserted between the heating roller 82 and the pressing roller 84, and thereby the same is heated and pressed to fix the toner image. At the downstream side from the fixing device 78, a paper discharging roller 86 for discharging the copy paper 58 after fixing onto the copy receiving tray 34 is installed.

A cleaning device 88 is installed above the above-described vacuum conveyor 76 and in the vicinity of the peripheral side surface of the photoreceptor-drum 46. This cleaning device 88 removes the toner left on the photoreceptor-drum 46 after transfer onto the copy paper 58. The cleaning device 88 comprises a blade 90 for scraping off the remaining toner from the photoreceptor-drum 46 and a screw conveyor 94 for transferring the toner scraped off by the blade 90 to a waste toner container 92.

Above the above-described fixing device 78, the main motor 96 for belt-driving the original table 14, the photoreceptor-drum 46, the vacuum conveyor 76 and so on through clutches is installed.

Figure 8:
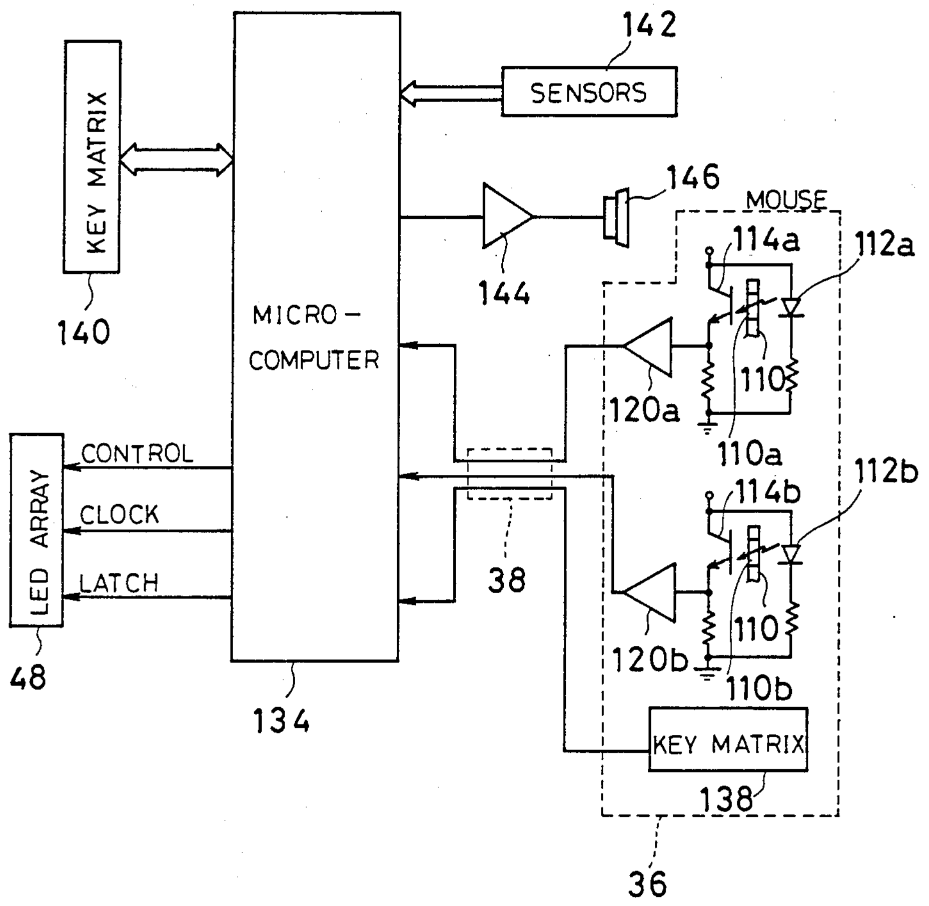
FIG. 8 is block diagram showing one example of a controlling system of the embodiment.

A control part 98 for controlling the whole operation of the copying machine 10 is installed at the left side part of the main motor 96. Various components required for a control system as described later, for example, as shown in FIG. 8 are accommodated in this control part 98.

Figure 3:
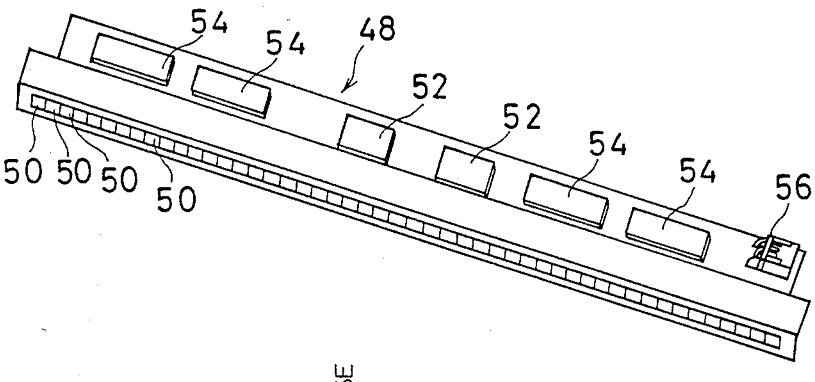
FIG. 3 is a perspective view of an LED array employed in this embodiment.
Figure 4:
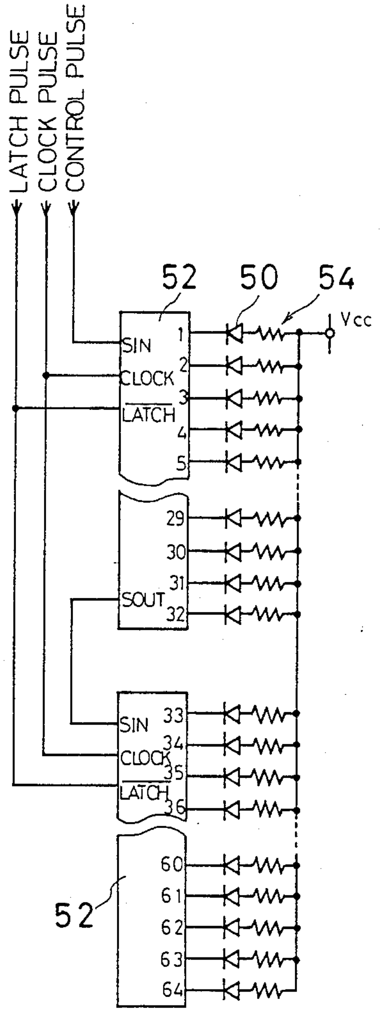
FIG. 4 is a circuit diagram of the LED array.

Here, description is made on the LED array 48 in reference to FIG. 3 and FIG. 4. As shown in FIG. 3, the LED array 48 comprises a rod-shaped unit on which, for example, sixty four (64) LED elements 50, 50, —are arranged closely in the lateral direction. Driver ICs52 for controlling lightening of the respective LED elements 50, resistance arrays 54 for adjusting the supplying voltage to the respective LED elements 50 and a connector 56 are further installed on the LED array 48. The LED elements 50, the driver ICs52 and the resistance array 54 are connected as shown in FIG. 4.

Lightening of the LED elements 50, 50,—is controlled by pulses supplied to input terminals SIN, CLOCK and LATCH of the respective driver ICs52. When the LED elements 50 are lightened to remove the charges on that portion of the photoreceptor-drum 46, a control pulse is given through the input terminal SIN in synchronism with the clock pulse so that the output terminal of the respective driver ICs52 to which the LED elements 50 to be lightened are connected go to the high level. Then, when the latch pulse is supplied through the input terminal LATCH, the output terminal of the respective driver ICs52 to which the LED elements 50 to be lightened are connected is kept high, and therefore the LED elements 50 hold the lightened state.

To lighten all of sixty four (64) LED elements 50, all the control pulses for sixty four (64) elements supplied through the input terminal SIN have only to go low and all the low levels have only to be held by the latch pulse.

Also, in "masking" as described later, the LED elements 50 between the two points to be masked are lightened for a predetermined time, and in "trimming", only the LED elements 50 between the two points are put out and the LED elements 50 outside them are lightened. In addition, lightening/putting-out of such LED elements 50 is controlled by converting the data of Y-ordinate obtained by the above-described mouse 36 (FIG. 1) into the positional data of sixty four (64) LED elements.

Figure 5A:
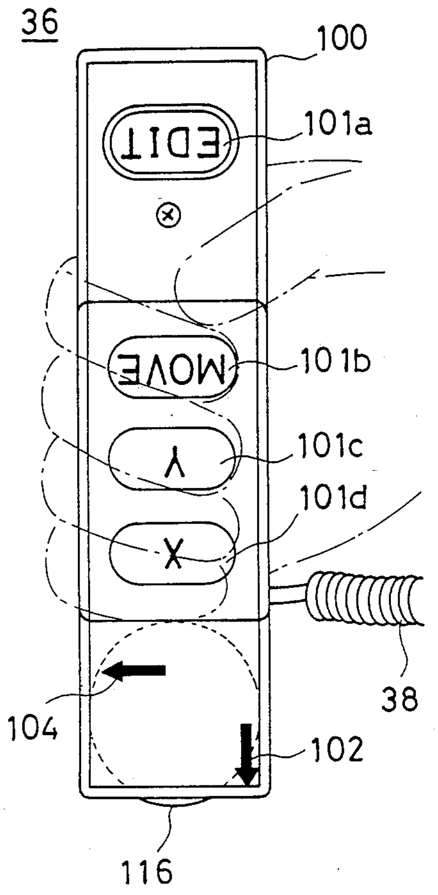
FIG. 5A is an illustrative view showing one example of arrangement of keys provided on the side surface of a mouse of the embodiment.
Figure 5B:
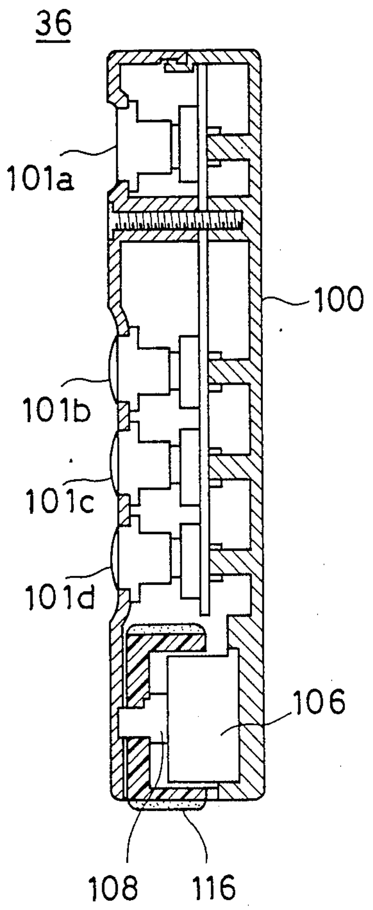
FIG. 5B is an illustrative view showing a structure of the mouse of the embodiment.

Next, description is made on the mouse 36 which is connected to the main unit 12 by the curled cord 38 in reference to FIG. 5A and FIG. 5B. As shown by one dotted lines in FIG. 5A, the mouse 36 comprises a box-shaped (parallelepiped) case 100 being long in the longitudinal direction which can be held or operated by a single hand, and necessary components are accommodated in this case 100.

Keys 101*a* through 101*d* operated in the editing mode are provided on one side surface of the case 100. Under the key 101*d*, an arrow mark 102 for indicating the position that the mouse 36 is to be placed at the end of the original 40 and an arrow mark 104 for indicating the normal direction of advance of the mouse 36 are formed.

Figure 6:
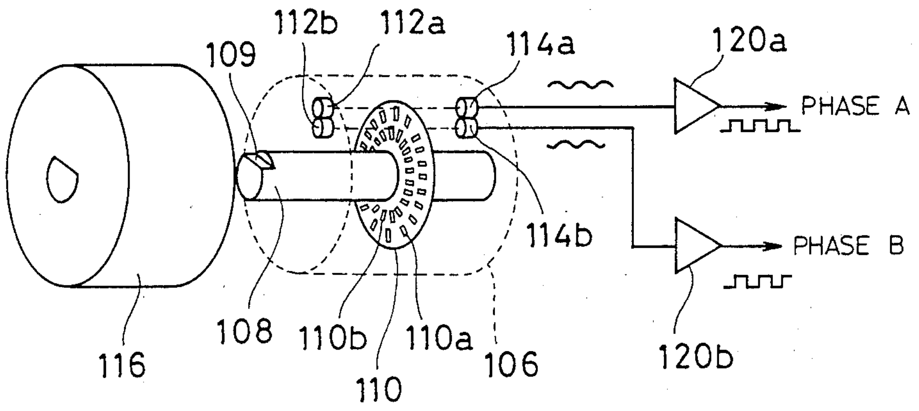
FIG. 6 is an illustrative view showing a pulse generating mechanism of the mouse.

As shown in FIG. 5B, a rotary encoder 106 is installed in the case 100. As shown in FIG. 6, a slit disc 110 fixed to a rotary shaft 108 is incorporated in the rotary encoder 106. In the slit disc 110, a plurality of slits 110*a* and a plurality of slits 110*b* are formed respectively on circumferences having different radiuses from the center of the slit disc 110. The slits 110*a* and 110*b* have nearly rectangular shapes respectively, and are formed so that each of both ends in the direction of arrangement is alternately disposed nearly at the center of each slit. This means that as described later, the slits 110*a* and 110*b* are formed at the position shifted from each other so that the direction of movement, that is, advance or retreat of the mouse 36 can be detected by the light passing through the slits 110*a* and 110*b*. Light emitting elements 112*a* and 112*b* for irradiating light and photodetectors 114*a* and 114*b* for detecting the lights from the corresponding light emitting elements 112*a* and 112*b* through the slits 110*a* and 110*b* respectively are mounted on the both sides of the slit disc 110.

A rubber roller 116 whose peripheral side surface protrudes partly beyond the bottom surface of the case 100 is fixed to the rotary shaft 108 of the rotary encoder 106. In addition, at a fitting part 109 of the rotary shaft 108 to which the rubber roller 116 is fitted, part of circular arc of the shaft is scraped. By scraping the fitting portion of the rotary shaft 108 in such a manner, the rubber roller 116 can be fixed firmly to the rotary shaft 108 without necessitating a key or a fixing screw. The rubber roller 116 rolls on the original 40 in editing, and the rotation responding to the rolling distance thereof is given to the slit disc 110. As shown in FIG. 5B, the major part of the rotary encoder 106 is accommodated or disposed in a recession formed in the roller 116. Thereby, space saving in the case 100, that is, a smaller size of the mouse 36 is obtained.

The distance of movement of the mouse 36 on the original 40 is converted into the rotation of the slit disc 110 by the rubber roller 116. The slit disc 110 blocks the lights of the light emitting elements 112*a* and 112*b* at constant intervals responding to the rotation thereof, and therefore voltage signals having a frequency according to the rotating speed are outputted from the photodetectors 114*a* and 114*b*. The voltage signals from these photodetectors 114*a* and 114*b* are wave-shaped respectively by voltage comparators 120*a* and 120*b*, converted into pulses, and given to the control part 98 of the main unit 12 through the curled cord 38 as signals of phase A and phase B.

In addition, the curled cord 38 connected to the mouse 36 is drawn out from the surface opposite to the arrow mark 104 showing the direction of advance of the mouse 36, and the position of draw-out is set in the vicinity of the rubber roller 116. This is because the mouse 36 is operated normally in the direction of the arrow mark 104 and therefore the curled cord 38 is drawn out from the side surface opposite to the direction of movement so that the curled cord 38 will not disturb the movement of the mouse 36. Also, in view of the stability of the mouse 36 in movement, the height of the position wherefrom the curled cord 38 is drawn-out is set in the vicinity of the rubber roller 116. This means that some tensile force is expected to act by the curled cord 38 when the mouse 36 is moved. If this tensile force acts, the mouse 36 becomes unsteady, making the stability worse. To prevent such unsteadiness, the curled cord 38 is connected to the position where the tensile force does not produce a moment of unsteadiness, that is, in the vicinity of the rubber roller 116.

FIG. 8 is a block diagram showing one example of a control system of this embodiment. The control system comprises a microcomputer 134. This microcomputer 134 controls not only editing but also operations of the whole electrophotographic copying machine. Although not illustrated in detail, the microcomputer 134 comprises a CPU, a ROM which is connected to this CPU and is for storing a program for control and the like, and a RAM having areas for temporarily storing data in controlling by the CPU and areas for various flags required for control, timer areas and a table for the LED array 48 (refer to FIG. 3).

The mouse 36 is connected to the input port of the microcomputer 134 through the curled cord 38. Three signal lines are contained in the curled cord 38, and pulses (pulse trains) from the voltage comparators 120*a* and 120*b* and data of a key matrix 138 comprised in the mouse 36 are inputted to the microcomputer.134 through the respective signal lines of the curled cord 38.

Furthermore, data of a key matrix 140 of the main unit 12 and outputs of sensors 142 including the paper size sensor 68 (FIG. 2) and etc. are inputted to the microcomputer 134.

An amplifier 144 is connected to the microcomputer 134, and a sound generator 146 such as a buzzer which informs the operator of the movement of the mouse 36 is connected to the output terminal of this amplifier 144. When the mouse 36 is moved in editing, a sound generator drive signal is outputted from the microcomputer 134 in response to the pulses given from the comparators 120*a* and 120*b* by rolling of the rubber roller 116. The amplifier 144 amplifies this signal and drives the sound generator 146, thereby informing the operator of the movement of the mouse 36 by sound.

Also, the partial erasure lamp, that is, the LED array 48 for partly erasing the electrostatic latent image becoming useless by editing is connected to the output port of the microcomputer 134. Description was made previously on the operation of this LED array 48.

Next, as shown in FIG. 5A, description is made on the various keys 101*a* through 101*d* installed in the mouse 36 in association with the display panel 30.

Figure 12:
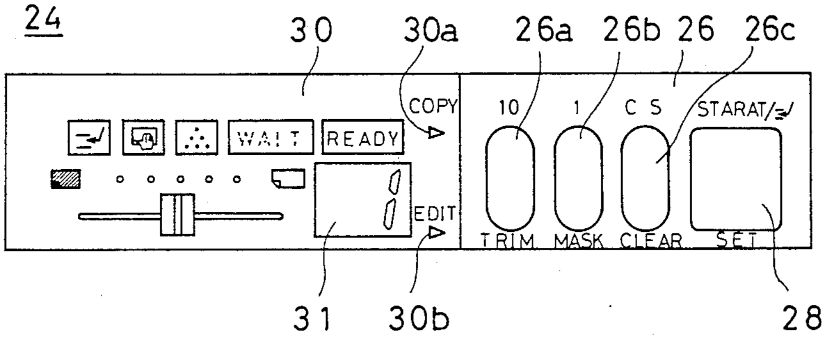
FIG. 12 is an illustrative plan view showing an operation panel.
Figure 7A:
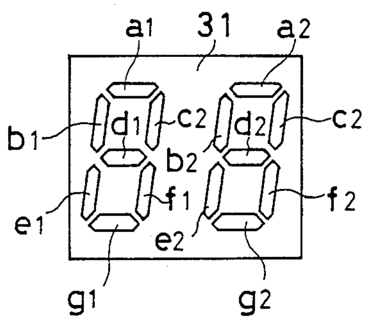
FIG. 7A through FIG. 7G are illustrative views respectively showing the states of lightening of a segmental display.

In FIG. 12, when the LED 30*a* on the display panel is lightened, the machine is in the copying mode. At this time, when the edit key 101a as shown in FIG. 5A is operated, the LED 30*a* is put out and the lightening is switched-over to the LED 30*b*, and the machine is changed-over to the editing mode. Then, the group of keys 26 and the start key 28 are put in the editing mode and the moving key 101*b*, the Y key 101*c* and the X key 101*d* of the mouse 36 are put in the enabled state. Then, on the segmental display 31 of the display panel 30, all segments a1–g2 are lightened as shown in FIG. 7A. Thereafter, as described later, the segmental display is lightened partially as shown in FIG. 7B through FIG. 7G in response to the operation of the moving key 101*b*, the Y key 101*c* and the X key 101*d*.

Next, prior to description on operation, description is made on outlines of "trimming", "masking" and "moving" in reference to FIG. 9A through FIG. 11B.

Figure 9A:
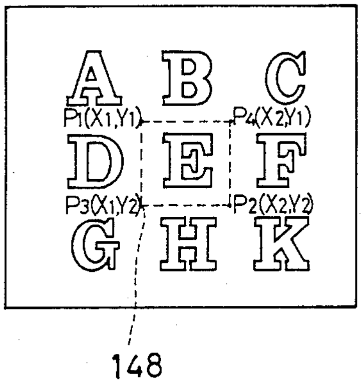
FIG. 9A and FIG. 9B are illustrating views showing "trimming".
Figure 9B:
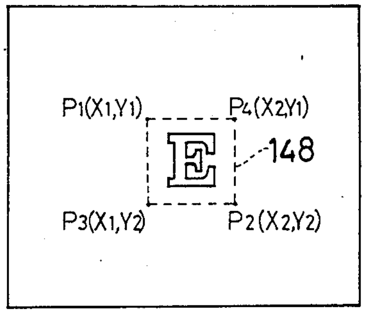

In "trimming", as shown in FIG. A, only a portion of the image corresponding to a rectangular area 148 formed by connecting four (4) specified points P1(X1,Y1), P3(X1, Y2), P2(X2,Y2) and P4(X2,Y1) is left intact, and the remaining portion of the image is erased as shown in FIG. 9B. Accordingly, in this mode, a plurality of LED elements 50, 50, —comprised in the LED array 48 are lightened only outside of the area 148.

Figure 10A:
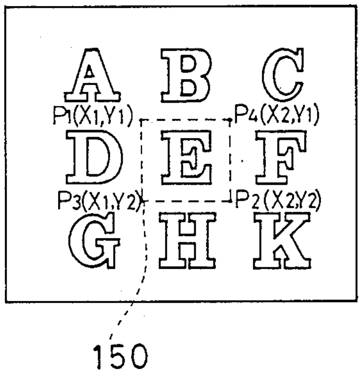
FIG. 10A and FIG. 10B are illustrative views showing "masking".
Figure 10B:
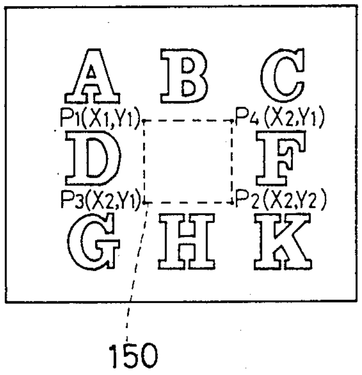

In "masking", as shown in FIG. 10A, only a portion of the image corresponding to a rectangular area 150 formed by connecting four specified points P1(X1,Y1), P3(X1,Y2), P2(X2,Y2) and P4(X2,Y1) is erased, and the remaining portion of the image is left intact as shown in FIG. 1OB. Accordingly, in this mode, a plurality of LED elements 50, 50, —comprised in the LED array 48 are lightened only in the area 150.

Figure 11A:
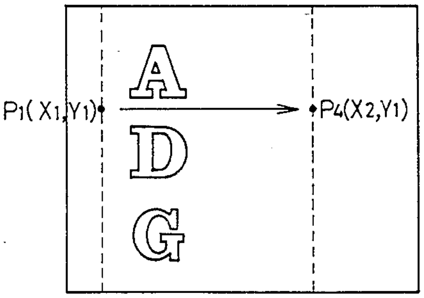
FIG. 11A and FIG. 11B are illustrative views showing "moving".
Figure 11B:
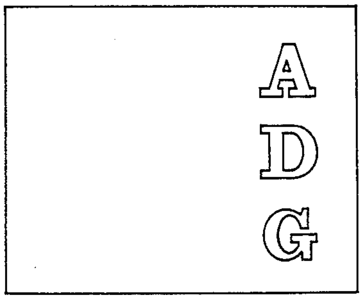

In "moving", as shown in FIG. 11A, coordinates P1(X1,Y1) of the front end or the rear end of the image to be moved are specified, and thereafter coordinates P4(X2,Y1) of the point whereto the image is to be moved with Y-ordinate kept constant are specified. Then, the position X1 on X-ordinate moves to X2 when the toner image is transferred onto the copy paper, and the moved image as shown in FIG. 11B is formed. This means that in this mode, as described later, timing of feeding paper is controlled by the data of coordinates while the LED array 48 is not used.

Next, prior to the copying operation, description is made on operation for editing. A count routine as shown in FIG. 15 is an interrupt routine, being executed at a constant period by an inner timer of the microcomputer 134, and data for specifying position of editing is set in the RAM in this count routine.

Figure 16:
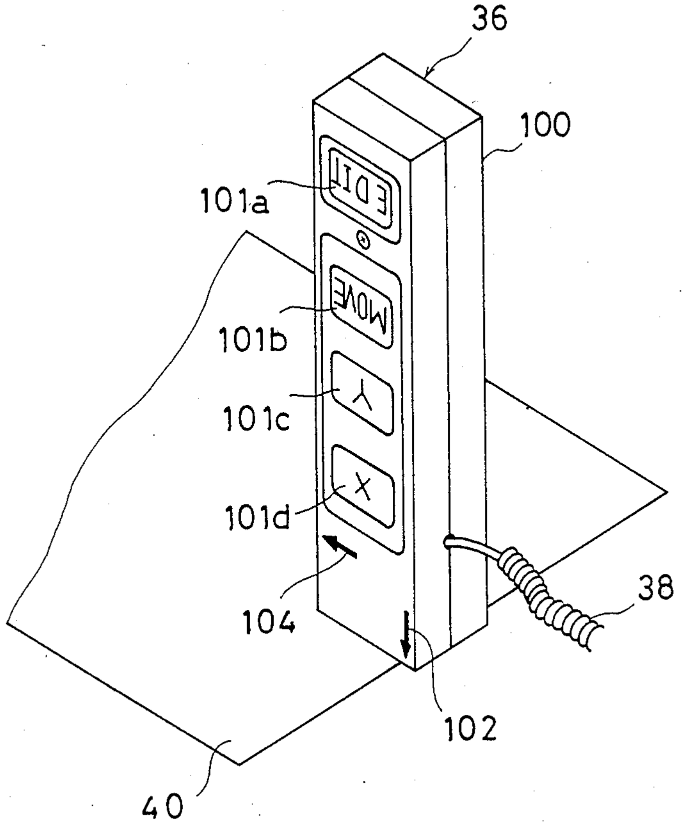
FIG. 16 is a perspective view showing the state that the mouse is disposed with an arrow mark agreeing with the end of an original.

In editing, the original 40 is put on a flat surface so that the surface of the original faces upward. The original may be put on the original table 16 as shown in FIG. 1, and also may be put on a quite different place. In short, the original 40 may be put on any flat surface so that the mouse 36 can make movement stably. Thereafter, as shown in FIG. 16, the mouse 36 is raised by hand and disposed on the original 40 so that the arrow mark 102 agrees with the end thereof. Then, by operating the edit key 101*a*, the mode is changed-over to the editing mode, and the LED 30*b* of the display panel 30 is lightened. Then, as shown by FIG. 17, for example, coordinates of four points in the area 148 for "trimming" or "masking" P1(X1,Y1), P3(X1,Y2), P2(X2,Y2) and P4(X2,Y1) are set by the mouse 36 in the following manner.

Figure 15:
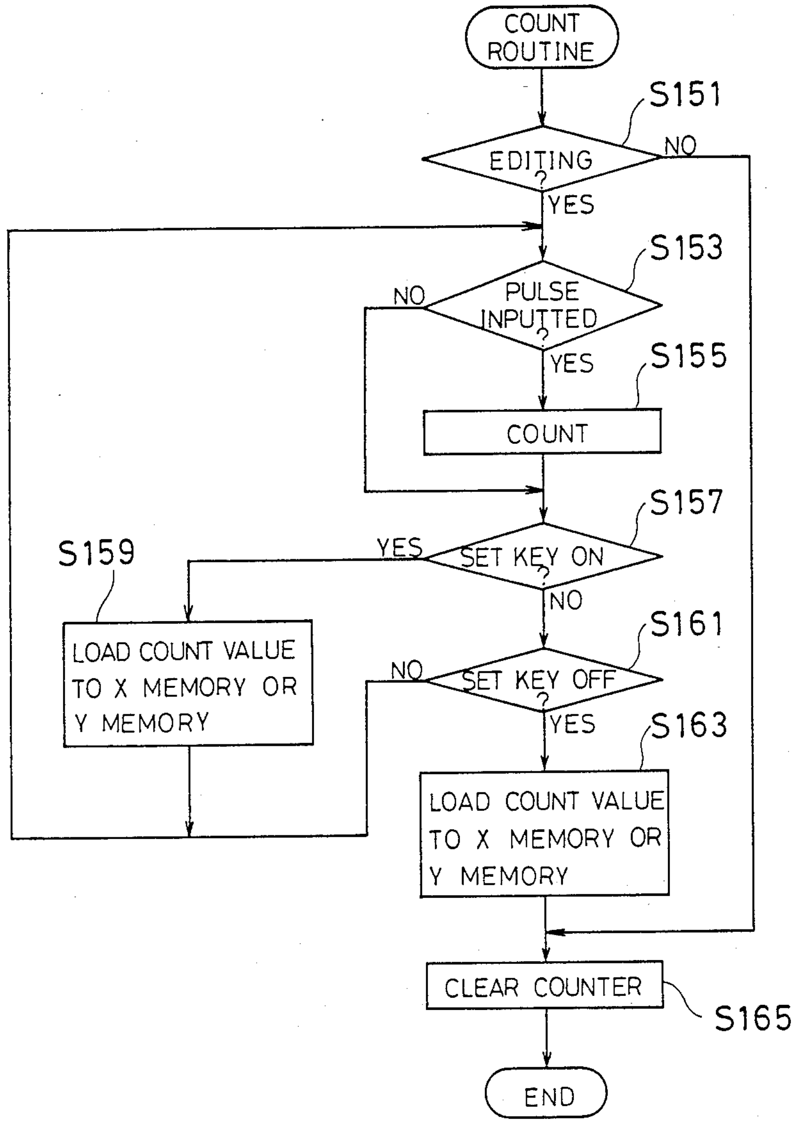
FIG. 15 is a flowchart showing a count routine of this embodiment.

First, in the first step S151 in FIG. 15, the microcomputer 134 checks whether or not the edit key 101*a* is operated, and determines whether or not editing of the original 40 is to be edited, that is, whether "trimming" or "masking" is to be performed or only normal copying is to be performed. If editing is to be performed, the lightening is switched-over to the LED 30*b* on the display panel 30, and if the normal copying without editing is to be performed, the lightening of the LED 30*a* is held.

Then, when the edit key 101*a* is operated, all the segments a1–g2 of the segmental display 31 shown in FIG. 7A are put out.

Figure 17:
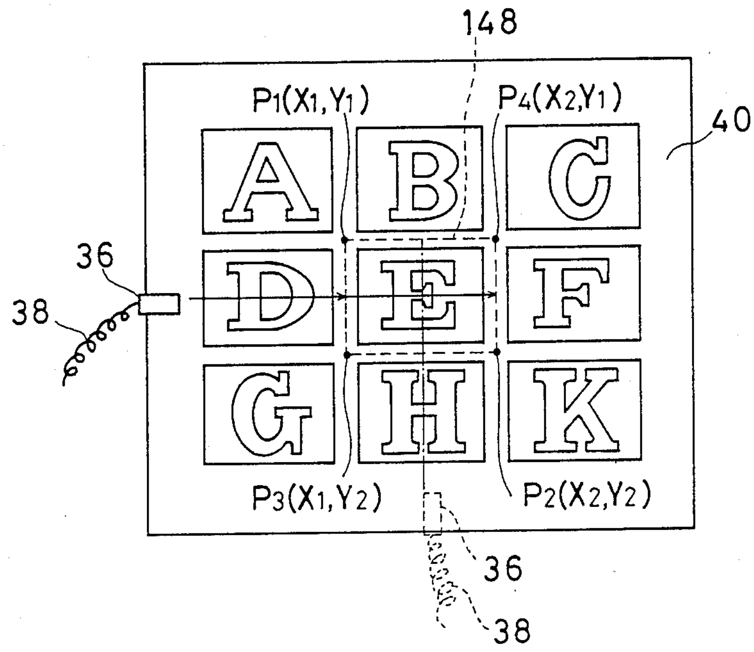
FIG. 17 is a illustrative view showing the state that "trimming" or "masking" is performed.
Figure 18:
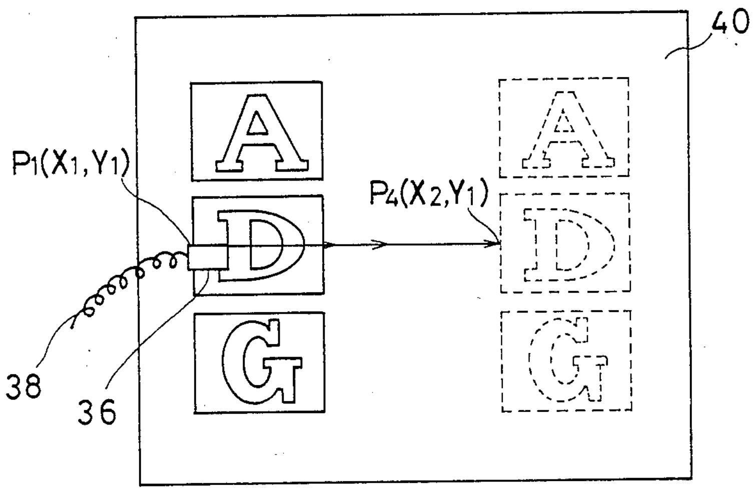
FIG. 18 is an illustrative view showing the state that "moving" is performed.

Thereafter, the operator moves the mouse 36 in the X-direction or Y-direction as shown in FIG. 17. Then, pulses are inputted to the microcomputer 134 from the rotary encoder 106.

More specifically, after placing the mouse 36 on the original 40 so that the arrow mark 102 agrees with the end thereof, the operator moves the mouse 36 by hand in the X-direction intersecting to a straight line P1P3 formed by connecting the points P1 and P3. When the mouse 36 moves in the X-direction, pulses from the voltage comparators 120*a* and 120*b* are inputted to the microcomputer 134. These pulses are detected by the microcomputer 134 in the step S153. In the microcomputer 134, a counter is assigned in a proper RAM area (not illustrated), and these pulses are inputted thereto. Accordingly, the microcomputer 134 counts the pulses in the step S155. The detail is shown in FIG. 19.

Figure 19:
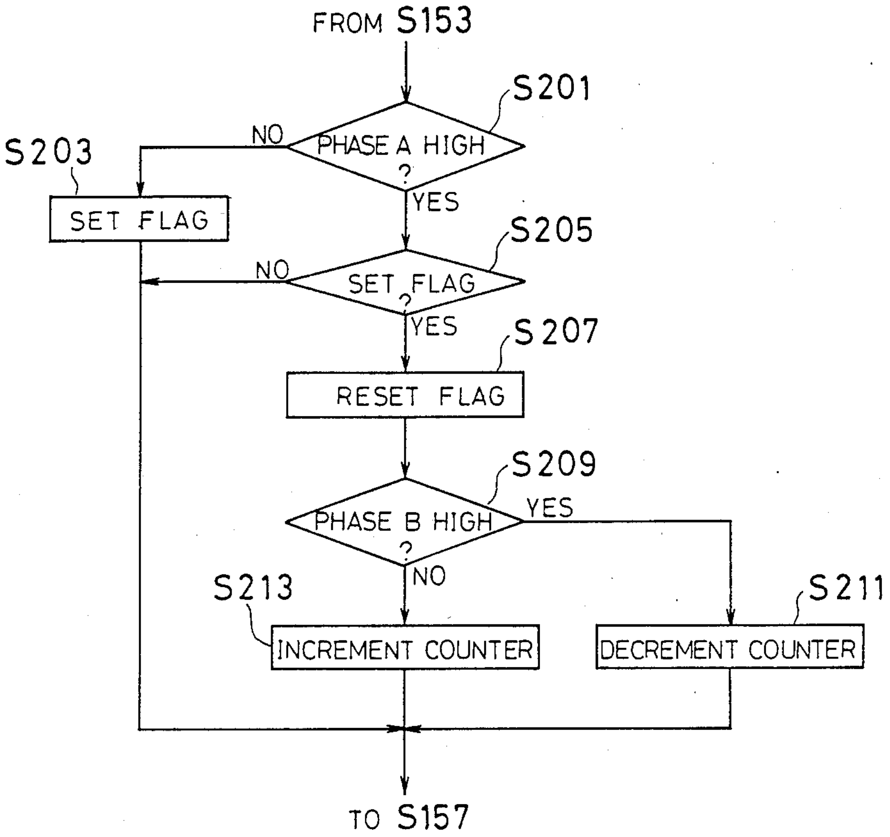
FIG. 19 is a flowchart showing counting operation of a counter when the mouse is moved forward or backward.

In the first step S201 of the count step as shown in FIG. 19, decision is made on whether or not the pulses of phase A outputted from the voltage comparator 120*a* are of the high level. If the phase A pulse is not high, that is of the low level, processing proceeds to the step S203.

In the step S203, a flag showing that the phase A pulse is of the low level is set in a predetermined area of the RAM of the microcomputer 134. After setting the flag in step S203, processing proceeds to step S157.

Figure 20:
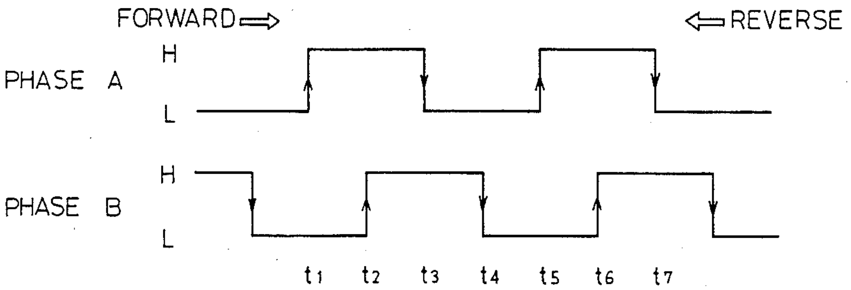
FIG. 20 is a timing chart showing pulses outputted from the mouse.

If the phase A pulse is determined to be high in the step S201, that is, if the phase A pulse goes to high at a time $t_1$ in FIG. 20, processing proceeds to the next step S205. Then, determination is made on whether or not the flag showing the low level of phase A is set in the predetermined area of the RAM. Then, when the flag set in the previous step 203 is made sure, processing proceeds to step S207. In the step S207, the flag set in the previous step S203 is reset. Then, processing proceeds to the following step S209.

In the next step S209, determination is made on whether or not the pulses of phase B outputted from the voltage comparator 120b are of the high level. When the phase B pulse is determined to be high, processing proceeds to the step S211. This means that in this time the mouse 36 advances in the direction shown by the arrow 104, and the rubber roller 116 rolls forward. Then, in FIG. 20, when the rubber roller 116 rolls forward, the phase A pulse rises to the high level at the time $t_1$, and thereafter the phase B pulse rises also to the high level without fail at a time $t_2$. After detecting the high level of the phase A pulse, the high level of the phase B pulse is detected, and thereby an advance of the mouse 36 is recognized.

In addition, the advance of the mouse 36 can be detected likewise by the high level of the phase A pulse detected at a time $t_5$ and the high level of the phase B pulse detected at a time $t_6$. At this time, in the step S211, the phase A pulses increment the counter assigned in a predetermined area of the RAM.

Next, when the mouse 36 retreats, that is, when the rubber roller 116 rolls reversely, for example, when it passes through a point whose position is specified and returns, time elapses from $t_7$ toward $t_1$ in FIG. 20. Then, in the step S201, even if a rise of the high level of the phase A pulse is detected at a time $t_7$, the phase B pulse is not detected as the high level in step S209 because the phase B pulse goes high at a time $t_5$. This means that when the rubber roller 116 rolls reversely, the phase B pulses are detected as the low level without fail after the high level of the phase A pulse has been detected.

In addition, likewise the above-described case of forward rolling, reverse rolling of the rubber roller 116 is detected also by a relation between times $t_3$ and $t_2$ likewise a relation between the times $t_7$ and $t_6$. At this time, in the step S213, the phase A pulses decrement the counter assigned in the predetermined area of the RAM.

Also, in the steps S211 and S213, an accurate distance of advance of the mouse 36 is calculated by incrementing or decrementing the same counter, but other methods can be applied. For example, a counter dedicated to counting pulses when the mouse 36 advances and a counter dedicated to count pulses when retreating are separately assigned, and counted values of these counters are processed by comparative operation, and thereby an accurate distance can be also calculated likewise.

Reverting to FIG. 15, the operator thereafter depresses the X key 101d when the arrow mark 102 reaches the straight line P1P3 in FIG. 17 by moving the mouse 36, that is, reaches the start point of the area to be specified. Responsively, the microcomputer 134 detects an operation of the X key 101d in the step S157.

Figure 7B:
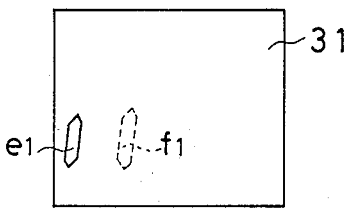

In the following step S159, a counted value at the timing when the X key 101d is depressed, that is, data corresponding to the X-ordinate X1 of the point P1 in FIG. 17 is inputted to a X memory assigned in the RAM of the microcomputer 134. Then, as shown in FIG. 7B, on the segmental display 31, only the segment e1 is lightened. Thereafter, processing returns to the previous step S153, and proceeds to the step S157 likewise.

Thereafter, the operator further moves the mouse 36, and releases the operation of the X key **101*d* when the arrow mark 102 reaches a straight line P4P2 in FIG. 17, that is, reaching the end point of the area to be specified. The microcomputer 134 detects this release of the X key 101*d* in step S161. This means that the operator depresses the X key 101*d* on the straight line P1P3 to specify the ordinate X1, and thereafter further moves the mouse 36 in the X-direction while depressing the X key 101*d* intact so that the arrow mark 102 crosses the straight line P4P2 at a right angle. Then, the operator releases the X key 101*d* when the arrow mark 102 positions on the straight line P4P2**.

When the microcomputer 134 detects the release of the X key **101*d*, in the step S161, in the following step S163, data corresponding to the X-ordinate X2 of the straight line P4P2 is set in the X memory assigned in the RAM likewise the previous step S159, and the segment f1 as shown by a dotted line in FIG. 7B is lightened. Accordingly, by this series of operations, the positions X1 and X2 on the X-ordinate of the four (4) points P1-P4** representing the intended area of editing are set.

In the following step S165, the counter in the RAM is cleared for movement in the Y-direction, that is, input of the Y-ordinate.

When setting Y1 and Y2 of the Y-ordinate, first the mouse 36 is also disposed as shown by a dotted line in FIG. 17, and the arrow mark 102 is disposed at the end of the original 40 likewise the setting of the X-ordinate.

Figure 7C:
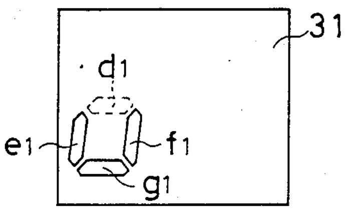

After detection of the end of the original 40, the operator moves the mouse 36 by hand in the Y-direction so that the arrow mark 102 crosses a straight line P3P2 at a right angle. When the arrow mark 102 is positioned on the straight line P3P2, the operator depresses the Y key **101*c* (FIG. 5A), and thereby data of the ordinate Y1 of the point P2 or P3 is set in a Y memory assigned in the RAM in step S159. Then, the segment g1 of the segmental display 31 is lightened as shown in FIG. 7C. Thereafter, when the arrow mark 102 reaches a straight line P1P4, the operator releases the Y key 101*c*, and thereby the Y-ordinate Y2 of the point P2 or P4 is set likewise the case of setting the X-ordinate X2. Then, the segment d1 as shown by a dotted line in FIG. 7C is also lightened. The data of this Y-ordinate Y2 is also set in the Y memory in the step S163**.

When the four (4) points P1(X1,Y1), P3(X3,Y2), P2(X2,Y2) and P4(X2,Y1) are set in such a manner, the segments d1–g1 of the segmental display 31 are lightened, and the area 148 as shown in FIG. 17 is set in the microcomputer 134.

Figure 7D:
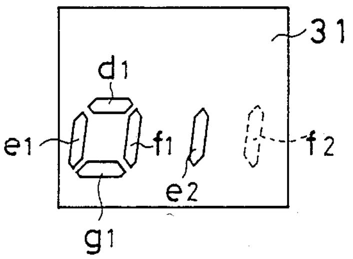
Figure 7E:
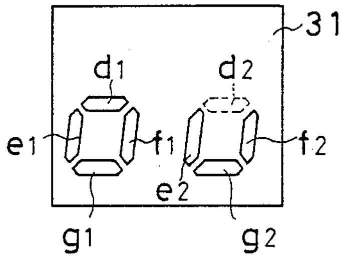

When setting a second area different from the area 148 as shown in FIG. 17, the operator may also operate the mouse 36 in the same manner. When the X-ordinate X1' of the second area is set, the segment e2 is lightened as shown in FIG. 7D. Then, when the X-ordinate is set and the Y-ordinate Y1' is set, the segment g2 is lightened as shown in FIG. 7E.

When one or two areas are set as described above, subsequently, either of "trimming" and "masking" of these set areas is selected. When the "trimming" is intended, the start key 28 as shown in FIG. 12 is operated. When the start key 28 is operated, the LED **30*b* of the display panel 30 is put out, and the LED 30*a* is lightened alternatively. When intending to perform the "masking", the operator operates the key 26*b* and then operates the start key 28. When the key 26*b* is operated, the segments d1–g2 of the segmental display 31 indicating one or two set areas start to blink. Accordingly, when the "masking" is selected, unlike the case of "trimming", the segmental display 31 blinks to call an enough attention of the operator. Then, if the "masking" has been set by mistake against the intention of "trimming" the set area, the mode is changed-over from "masking" to "trimming" by operating the key 26*a*. Then, the blinking of the segmental display 31 is stopped. If the "masking" is intended to be done again here, the key 26*b*** has only to be operated.

When intending to perform the "moving", the operator disposes the arrow mark 102 of the mouse 36 at the front end part to be moved of the original 40. Thereafter, the operator operates the moving key 101*b*, and then moves the arrow mark 102 in the X-axis in the state of depressing the X key 101*d* likewise the case of setting the area of "trimming" or "masking". When the X key 101*d* is depressed, the segment a1 of the segmental display 31 is lightened. Then, when the arrow mark 102 is positioned at the point to be moved, that is, the coordinates P3, the X key 101*d* is released. Then, the distance in the direction of X-axis from the coordinates P1 to P3 is inputted to the X memory assigned in the RAM of the microcomputer 134. Then, the segment a2 of the segmental display 31 is also lightened.

Figure 7F:
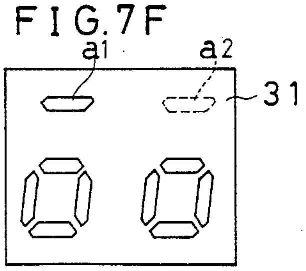
Figure 7G:
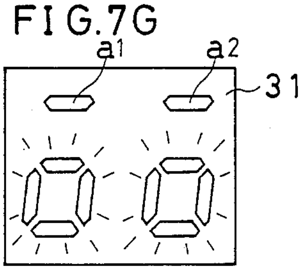

FIG. 7F shows the case where two "trimming" areas are set and thereafter the "moving" is set together with them, showing the state of the segmental display 31 when the Xordinate X1 of the point P1 is set. Accordingly, the Xordinate X2 of the P3 is not set yet, and therefore the segment a2 is not lightened. FIG. 7G shows the state of the segmental display 31 in the case where the "masking" and "moving" are set together.

Next, description is made on operation of this embodiment based on flowcharts as shown in FIG. 13A, FIG. 13B, FIG. 13C, FIG. 14A and FIG. 14B.

On completing the position specifying for editing, the original 40 is put on the original table 16 so that the right-bottom corner coincides with the corner of the positioning plate 20. Thereafter, the original cover 18 is closed and the start key 28 is operated to start copying operation.

Figure 13A:
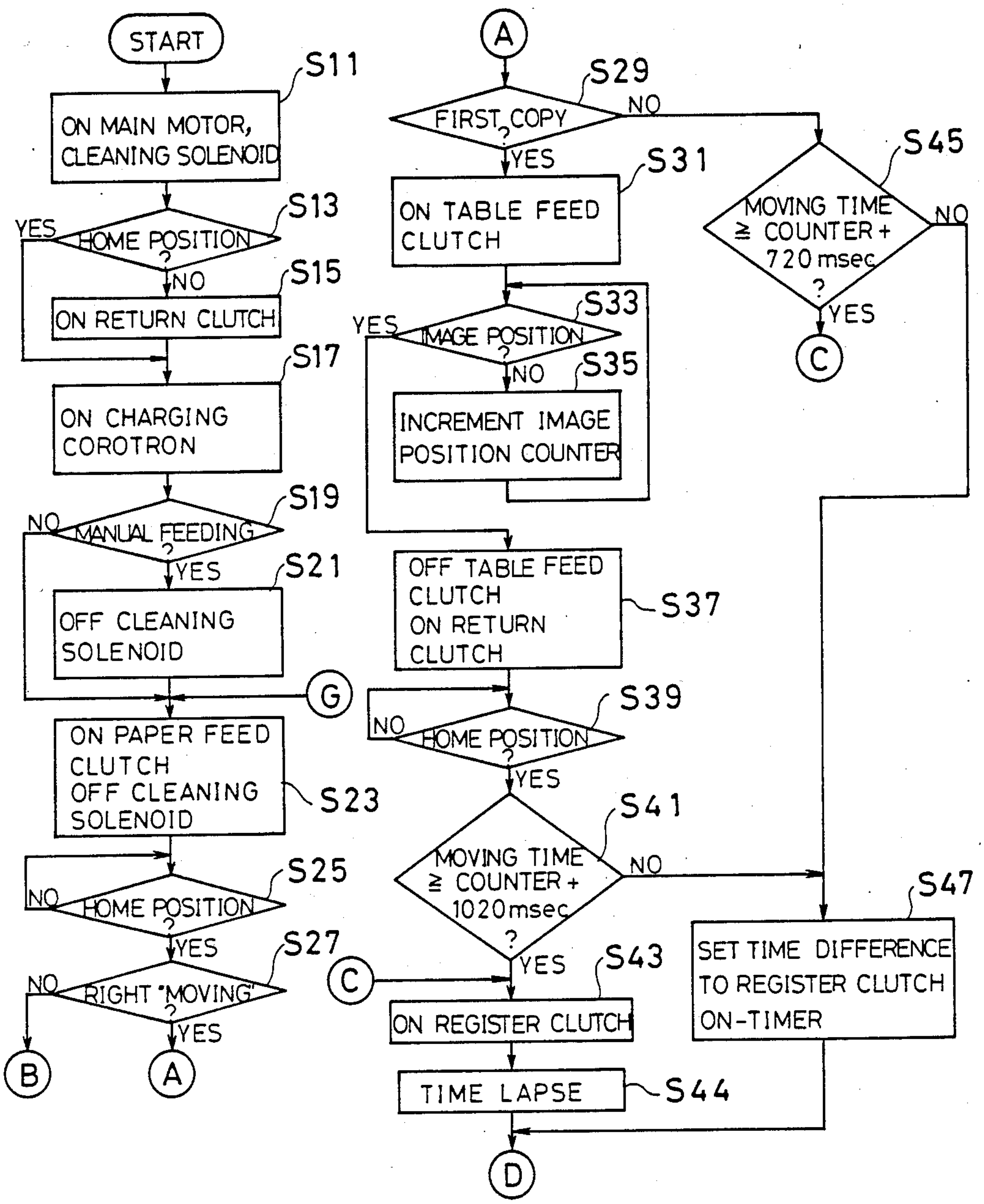
FIG. 13A, FIG. 13B and FIG. 13C are flowcharts showing operation of the embodiment.

When the start key 28 is operated, the main motor 96 for driving the original table 14, the photoreceptor-drum 46 and so on is turned on in the first step S11 in FIG. 13A. When rotation of the main motor 96 becomes stable, that is, when one second elapses from turn-on of the main motor 96, a solenoid of the cleaning device 88 is turned on, and the tip part of the blade 90 is brought in contact with the photoreceptor-drum 46. After a lapse of a predetermined time from turn-on of the solenoid, for example, a lapse of 100 milliseconds for preventing the power source from simultaneous loading, processing proceeds to the next step S13.

In the step S13, the microprocessor 134 checks for the signal from the sensor 142 (FIG. 8), and determines whether or not the original table 14 is located at the home position, that is, the right end of the original table 14 is positioned at the left side of the main unit 12. If the original table 14 is located at the home position, processing proceeds to the next step S17, and if not, in the step S15, a return clutch (not illustrated) for moving the original table 14 to the home position is turned on, and the original table 14 is returned to the home position. Turnoff of this return clutch is performed by interrupt processing as described later.

In the step S17, the transferring corotron 72 is turned on. After turning on this transferring corotron 72, processing proceeds to the following step S19. In the step 19, determination is made on whether or not copying is by manual paper feeding, that is, whether or not the copy paper 58 is fed by manual insertion rather than from the paper feed cassette 32. If copying is by manual insertion, processing proceeds to the next step S21, and the solenoid of the cleaning device 88 turned on in the previous step S11 is turned off. If copying is not by manual insertion, proceeding proceeds to the step S23 without passing through the step S21.

In the next step S23, first a paper feed clutch is turned on, the paper feed roller 66 starts to rotate, and the copy paper 58 is transferred toward the register roller 70. At the same time, the solenoid of the cleaning device 88 is turned off.

In the case of copying by manual insertion in the step S19, that is, in the case of passing through the step S21, the solenoid is turned off twice, but the solenoid has no change at all because only a turn-off signal is supplied. After a lapse of 200 milliseconds from turn-off of the solenoid, processing proceeds to the next step S25. This time of 200 milliseconds is a time for deciding a jam of the copy paper when the copy paper 58 is transferred by turning on the paper feed clutch.

In the step S25, determination is made on whether or not the original table 14 is located at the home position, and if it is located at the home position, processing proceeds to the following step S27.

In the step S27, the microcomputer 134 determines whether or not right "moving" has been specified by the mouse 36. This means that determination is made on whether or not setting has been made so that the image moves to the right by the moving key 101*b* and the X-key 101*d* after the edit key 101*a* (FIG. 5A) of the mouse 36 has been operated. If setting is made so that the image moves to the right, processing proceeds to the step S29, and if right movement of the image is not set, processing proceeds to the step S51.

In the step S29, determination is made on whether or not the copy is the first one. If the copy is the first one, processing proceeds to the step S31, and if the copy is not the first one, that is, if the copy is the second or the following one, processing proceeds to the step S45.

In the step S31, after a lapse of 300 milliseconds, a feed clutch (not illustrated) for scanning the original table 14 is turned on. In the next step S33, determination is made on whether or not the original table 14 is positioned at the image position. The image position, that is, the position of the original table 14 for starting to form the image of the original 40 as an electrostatic latent image on the photoreceptor-drum 46 is determined. If the original table 14 is not reached at the image position, the time from the home position to the image position is counted by a counter in the following step S35. If the original table 14 comes to the image position, processing proceeds to the next step S37. In the step 37, the table feed clutch is turned on, and 200 milliseconds after that, the return clutch of the original table 14 is turned on.

Thus, in the case where right movement is set and the copy is the first one, the time taken from the home position to the image position is unknown, and therefore it is required to measure that time by moving the original table 14 before starting copying.

Subsequently, in the step S39, determination is made on whether or not the original table 14 has returned to the home position. When the original table 14 returns to the home position, processing proceeds to the next step S41, and in the step S41, determination is made on whether or not the time taken for moving the image to the right is longer than a sum of the time counted in the previous step S35 and 1020 milliseconds. This 1020 milliseconds is a sum of 200 milliseconds set in the step S51 as described later, 300 milliseconds after the step S53, 100 milliseconds set in the step S55 and 420 milliseconds set in the step S71. This means that it is required that feeding of the copy paper proceeds forming of the latent image to move the image to the right, and determination is made on whether or not this time of precedence is shorter than the original starting time of paper feeding, that is, the time up to timing of turning on a register clutch in the step S75.

When the time of movement of the image is longer than the sum of the value counted in the previous step S35 and 1020 milliseconds, the register clutch is turned on via the next step S43, and timing adjustment is made in the step S44, and thereafter processing proceeds to the step S49. If "NO" is determined in the step 41, processing proceeds to the step S47, and that time difference is set in a register clutch on-timer (not illustrated) assigned in the RAM. Thus, when the time of movement is shorter than the time of the image position counter plus 1020 milliseconds, that time difference is set in the register clutch on-timer in the RAM, and that timer is counted in an interrupt routine as described later. If that timer expires, the register clutch is turned on at that point of time.

On the other hand, if it is determined that the copy is not the first one in the previous step S29, the time (timing) to be measured from the step S31 to the step S41 has been already obtained by the first copy. Accordingly, in the step S45, determination is made on whether or not the time of movement of the image is longer than a sum of the time counted in the step S35 and 720 milliseconds. This 720 milliseconds is a difference 1020 milliseconds in the step S41 and 300 milliseconds required for changing the direction of the original table 14 which is set after the step S53, being the time by which the register roller clutch is to be turned on earlier than the normal timing of paper feeding. When the time of movement is longer than the sum of the time counted in the step S35 and 720 milliseconds in the step S45, processing proceeds to the step S43, and if shorter, processing proceeds to the following the step S47. Accordingly, when "NO" is determined in the step S45, that is, when the time of movement is shorter, timing thereafter is to be determined in the interrupt routine likewise the case of "NO" in the previous step S41.

In the step S49 (FIG. 3B), the LED array 48 is turned on so that all the LED elements 50 are lightened. This means that the microcomputer 134 gives a signal for "full lightening" to the LED array 48. When the image is to be moved to the right, the LED array 48 is fully lightened here to prevent an image at the left side of the original 40, for example, an image of the positioning plate 20 from being formed on the photoreceptor-drum 46, that is, to erase a useless electrostatic latent image.

Thereafter, in the step S51, the light source 42 for irradiating (exposing) light onto the original 40 is turned on, and because of a slow rise of the light source 42, processing proceeds to the following step S53 after a lapse of 200 milliseconds. In step S53, determination is made on whether or not the copy is the first one likewise the previous step S29. If the copy is the first one, because of a slow rise of the light source 42 turned on in the previous step S51, processing proceeds to the step S55 after a further lapse of 300 milliseconds required for stabilization.

In the step S55, the charging corotron 48 is turned on, and at the same time, the table feed clutch is turned on.

In the following step S57, determination is made on whether or not the original table 14 has been fed to the image position. If it does not reach the image position, the time taken from the home position to the image position is counted in the next step S59. In the case of continuous copying, the data counted in this step S59 is used as image position data for right movement of the image. If it is decided that the original 14 table has reached the image position in the step S57, processing proceeds to the following step S61.

In the step S61, the microcomputer 134 checks for a signal from the mouse 36, and determines whether or not "trimming" is set. If it is determined that "trimming" is not set in the step S61, the LED array 48 turned on in the previous step S49 are turned off or put out. If it is determined that "trimming" is set, processing proceeds to the step S65, while turn-on or full liqhtening of the LED array 48 is kept intact.

In the step S67, the microcomputer 134 checks for the signal from the mouth 36, and decides whether or not "masking" is set. If it is decided that "masking" is set, processing proceeds to the next step S69.

In the step S69, the position of X-ordinates of the points P1, P3, P2 and P4 for "trimming" or "masking" set by the mouse 36 are checked. Specifically, start of the X-ordinate detection is determined in the above-described interrupt routine, and thereafter detection is made in that interrupt routine. Then, in the step S71, the time up to the completion of feeding of the original table 14 is counted. Thereafter, processing proceeds to the next step S73 after a lapse of 420 milliseconds equivalent to the timing of paper feeding in the normal case.

In the step S73, likewise the previous step S27, determination is made on whether or not the "moving" in which the image is to be moved to the right is set. If right movement is set, since the register roller 70 is already driven by turning on the register clutch in the previous step S43, driving of the register roller 70 is detected, and processing proceeds to the step S77.

If it is determined that right movement of the image is not set, that is, when the image is to be moved to the left in the "moving", the time taken for left moving is mounted in the next step S74, and thereafter the register clutch is turned on.

When it is detected that the original table 14 has been fed to the return position in the step S77, processing proceeds to the next step S79, and the return clutch is turned on and the exposure light source 42 is turned off, and then the LED array 48 being turned on in the previous step S49 is put out in step S79.

In the step S81 (FIG. 13C) thereafter, the microcomputer 134 checks for a copy quantity counter, and determines whether or not copying is to be continued. If copying is to be continued, a paper feed sensor is turned off in the next step S83, and thereafter processing returns to the previous step S23. This means that processing of and after the second copy is started in this step S23.

If it is determined that copying is not to be continued in the step S81, processing proceeds to step S85, and the return clutch being turned on in the previous step S79 is turned off. Thereafter, the charging corotron 72 is turned off after a lapse of the time of transfer of the electrostatic latent image on the photoreceptor-drum 46 onto the copy paper 58, for example, 200 milliseconds. Then, processing proceeds to the step S87. In the step S87, turn-on of a paper discharge sensor by a discharge of the copy paper 58 is detected, and processing proceeds to the next step S89. In the step S89, the main motor 96 is turned off after a lapse of 200 milliseconds required for discharging the copy paper 58. Then the copying machine is put in the ready state.

Figure 14A:
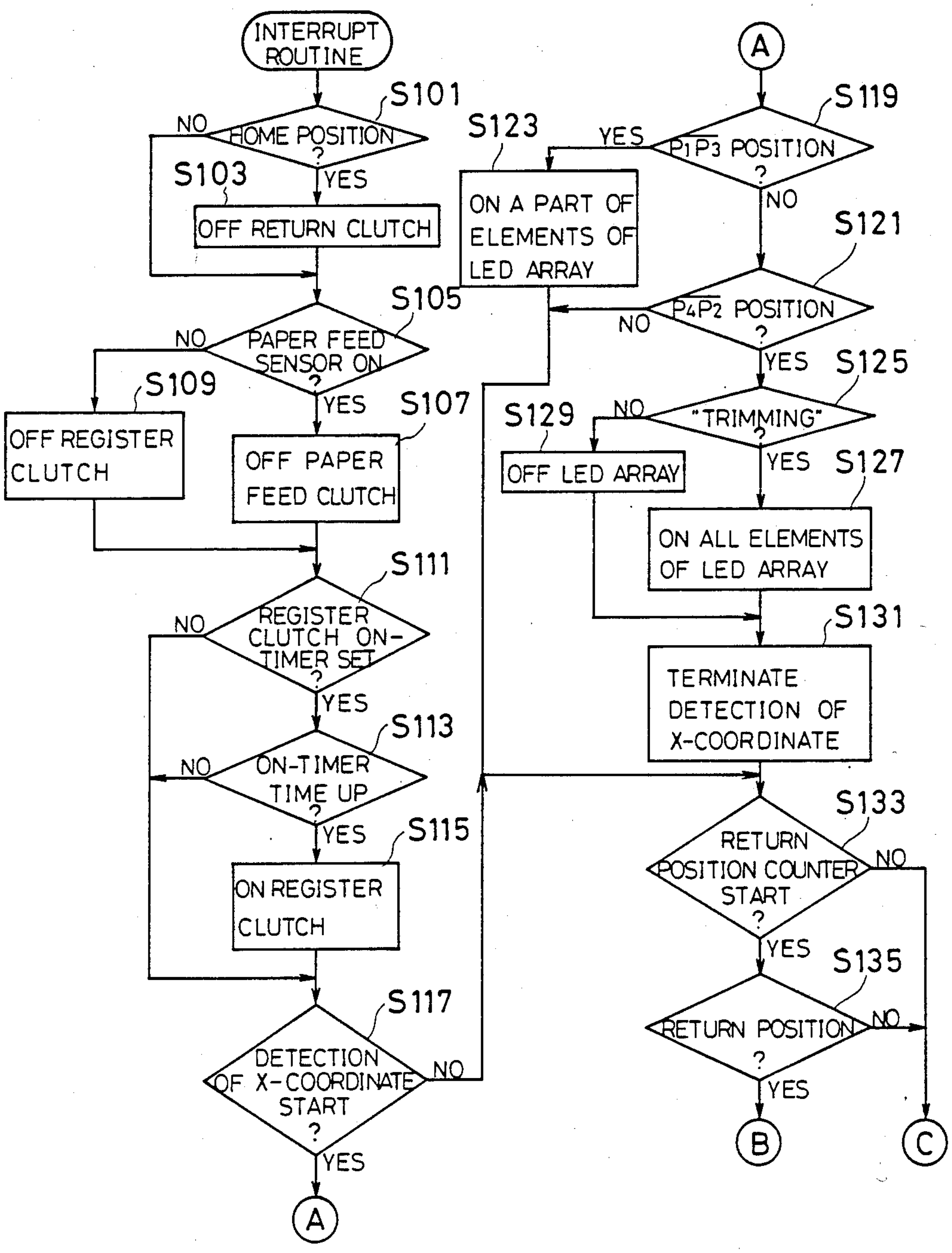
FIG. 14A and FIG. 14B are flowcharts showing an interrupt routine of the embodiment.
Figure 14B:
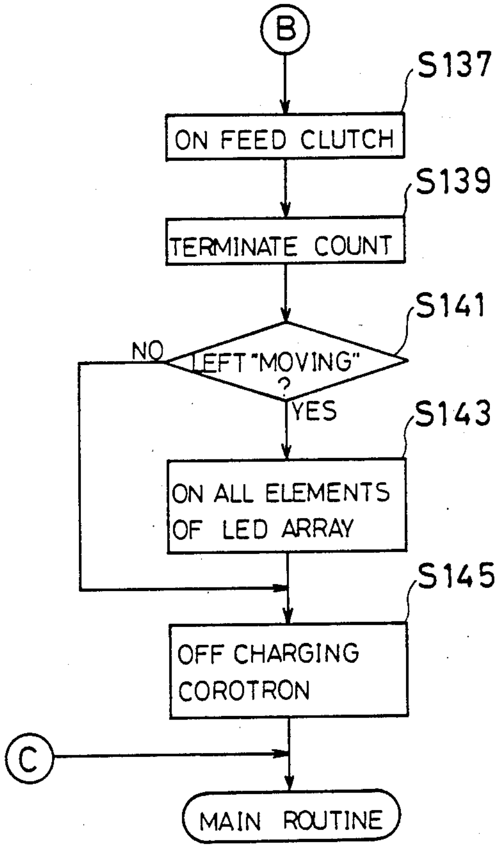

Next, description is made on another interrupt routine of this embodiment in reference to FIG. 14A and FIG. 14B. This interrupt routine is called at constant periods by an inner timer of the microcomputer 134.

This interrupt routine determines principally the timing of turn-on of the register clutch in the "moving" mode, and also controls the position and timing of lightening of the LED array 48 in the "trimming" or the "masking" mode.

In the first step S101, the microcomputer 134 determines whether or not the original table 14 is located at the home position likewise the step S13 in the previous FIG. 13A. If it is not located at the home position, processing proceeds intact to step S105, but if located at the home position, the return clutch is turned off in the step 103, and thereafter processing proceeds to step S105.

In the step S105, determination is made on whether or not the paper feed sensor is turned on, that is, whether or not the copy paper 58 has been transferred to the register roller 70. Then, when the transfer of the copy paper 58 is made sure, the paper feed clutch is turned off in the step S107. Thereafter, processing proceeds to the step S111. If the preceding copy paper has been transferred, the paper feed sensor is turned off, and therefore the microcomputer 134 turns off the register clutch in the following step S109, thereafter proceeding to the step S111.

In the step S111, when right movement of the image is set by the mouse 36, determination is made on whether or not the time difference between the time of movement and the timing of start of the electrostatic latent image has been set in a register clutch on-timer assigned in the RAM in the step S47. If "YES" is determined in this step S111, the microcomputer 134 determines whether or not this on-timer has expired in the following step S113. Then, when the register clutch on-timer expires through several times of executions of this interrupt routine, the microcomputer 134 turns on the register clutch in the step S115. This means that at this point of time, the timing of paper feeding for right movement of the image is determined.

In the next step S117, the microcomputer 134 determines whether or not "trimming" or "masking" is set and detection of the X-ordinate for controlling the LED array 48 has been started. This can be determined, for example, by setting a flag in the step S69 (FIG. 13B) and detecting by the microcomputer 134 whether or not that flag is set.

When start of the X-ordinate detection is determined, the microcomputer 134 determines whether or not one side defined by the straight line P1P3 of the area to be trimmed or masked (specified by the points P1, P3, P2 and P4) has reached just under the partial erasure lamp, that is, the LED array 48. Then, when the area to be trimmed or masked reaches this LED array 48, the microcomputer 134 gives signals to the LED array 48 so as to lighten all the LED elements 50 outside that area in the "trimming" mode and lighten all the LED elements 50 in that area in the "masking" mode. Thereby, the LED elements 50 of the LED array 48 required for "trimming" or "masking" are partially and selectively lightened in the step S123.

If "NO" is determined in the step S119, the microcomputer 134 determines whether or not one side defined by the straight line P4P2 of the area to be trimmed or masked has reached just under the LED array 48 in the following step S121. Then, if this is detected in step S121, processing proceeds to the next step S125.

In the step S125, the microcomputer 134 determines whether "trimming" or "masking" is set. If "trimming" is set, thereafter all the LED elements 50 of the LED array 48 are lightened in the step S127. In reverse, if "masking" is set, all the LED elements 50 of the LED array 48 partially lightened are put out in the step S12. After execution of the step S127 or the step S129, the microcomputer 134 completes detection of the X-ordinate.

Thereafter, in the step S133, the microcomputer 134 determines whether or not count of the position whereto the original table 14 is to be returned which is started in the previous step S71 has been started. Then, in the step S135, the time required for feeding the original table 14 by the length of the original in the direction of movement of the original table (including a margin) is counted, and determination is made on whether or not the original table 14 has reached the position whereto it is to be returned. Then, if "YES" is decided in the step S135, the microcomputer 134 turns off the table feed clutch in the next step S137, and completes the count of the feeding position in the next step S139.

Figure 13B:
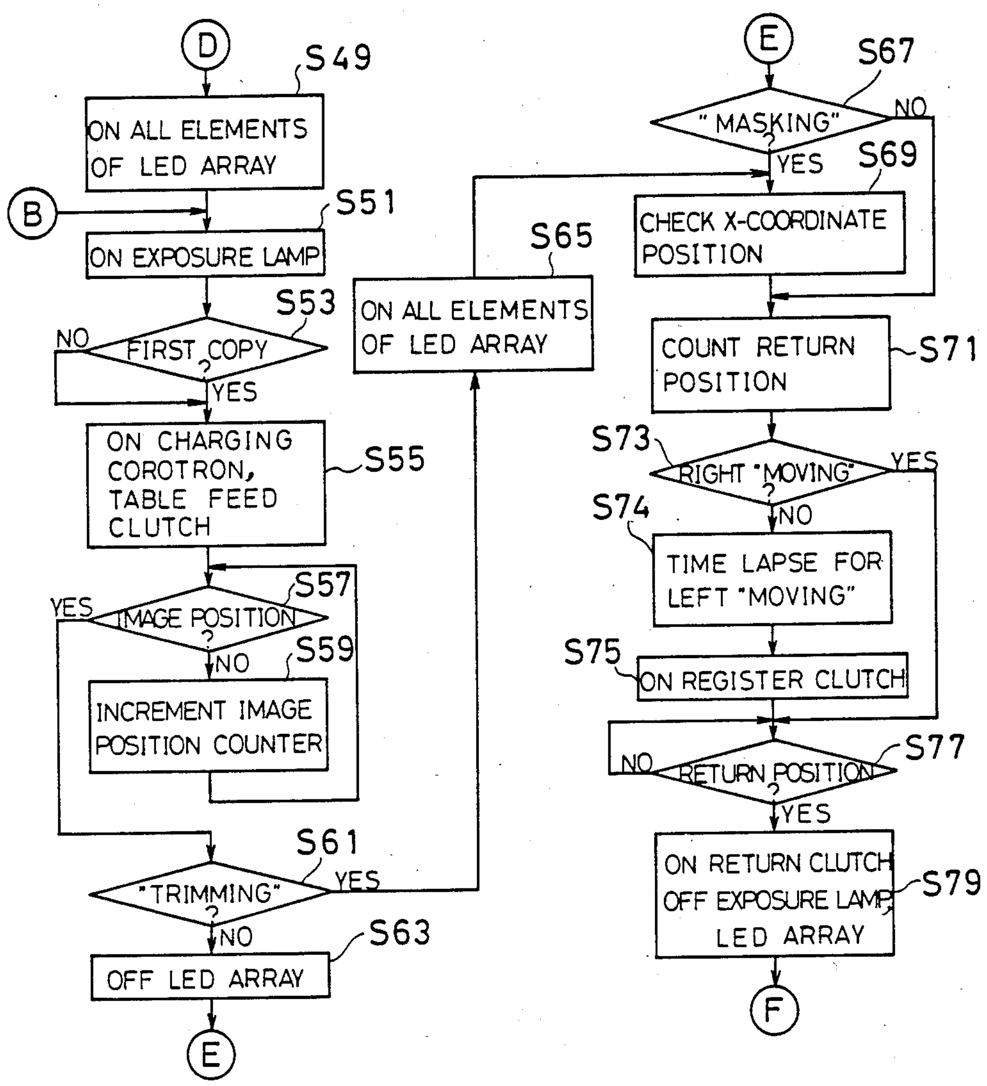
Figure 13C:
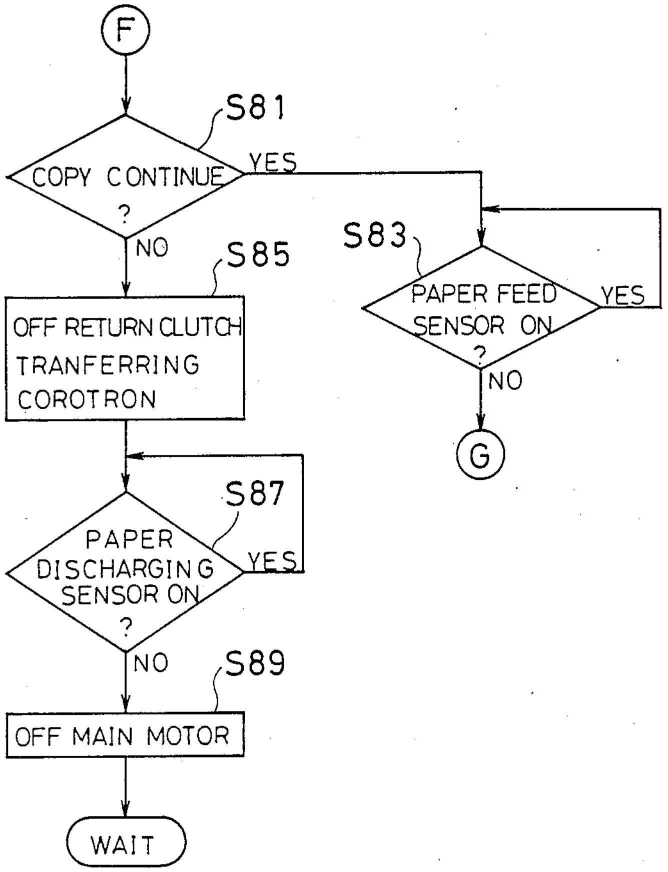

In the step S141 thereafter, the microcomputer 134 determines whether or not the left "moving" is set based on the signal from the mouse 36. If left movement is set, the LED array 48 is fully lightened to erase the electrostatic latent image not required for that left movement in the next step S143, and the charging corotron 47 (FIG. 2) is turned off in the step S145 to prevent charging onto the photoreceptor-drum 46 thereafter. After the step S145 has been executed, processing returns to the main routine as shown in FIG. 13A, FIG. 13B and FIG. 13C likewise the case where "NO" is decided in the previous steps S133 and S135 respectively.

Thus, in accordance with the above-described embodiment, in "trimming" or "masking", the area or range of lightening of the LED array 48 (partial erasure lamp) is controlled corresponding to the area defined by the four (4) points P1, P3, P2 and P4 which are set by the mouse 36. Also, when "moving" is set, the microcomputer 134 controls the image position and the deviation of paper feed timing in accordance with the amount of movement based on the positional data inputted from the mouse 36.

In addition, in the above-described embodiment, since the state of the position specifying is displayed by the segmental display 31 of two digits in the editing mode, and only two areas can be set to specify the position for "trimming" or "masking". However, if no display is performed, it is needless to say that a plurality of areas can be further specified.

Figure 21:
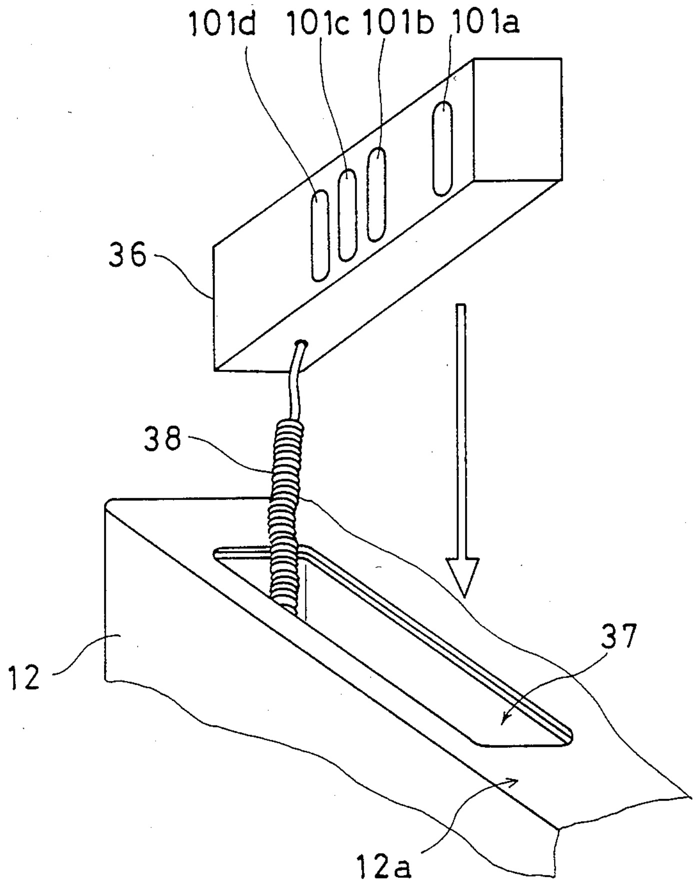
FIG. 21 is a partial perspective view showing a recession for putting a mouse therein.
Figure 22:
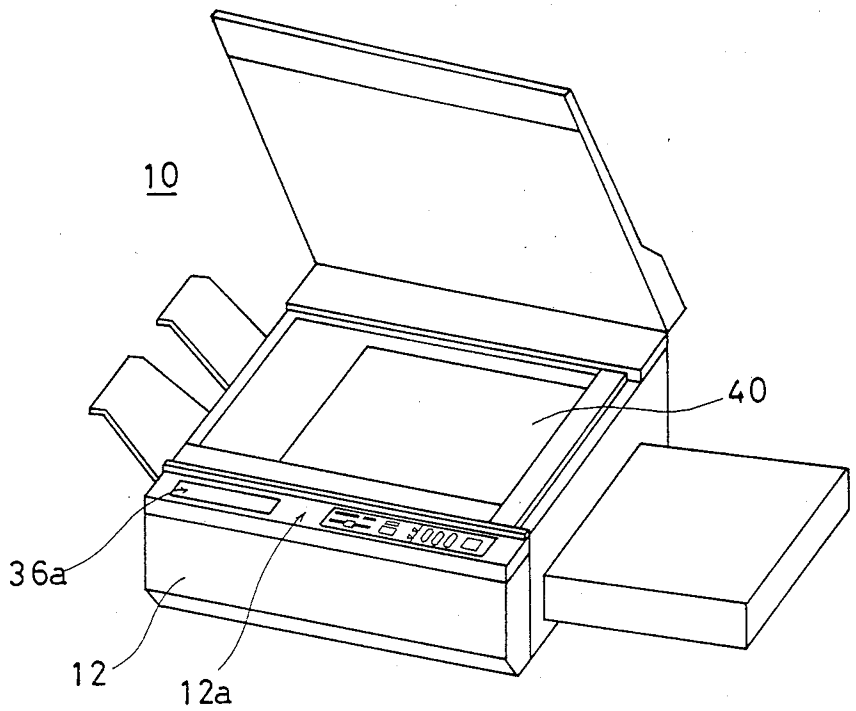
FIG. 22 is an appearance view showing the state that the mouse is put in the recession.

Next, description is made on the housing part of the mouse 36 in reference to FIG. 21 through FIG. 24B. The recession 37 for placing the mouse 36 thereinto is formed on a top surface 12*a* of the front of the copying machine main unit 12. The mouse 36 is connected with the expansion cord 38 led out from the bottom part of this recession 37, and can be housed in the recession 37 with the side surface to which the cord 38 is connected facing downward. Then, the recession 37 is deep enough to wholly house the mouse 36. As shown in FIG. 22, when the depth of recession 37 is selected so that one side surface 36*a* of the mouse 36 is flush with the top surface 12*a* of the main unit 12 when the mouse 36 is housed, it is convenient to take out the mouse 36 by the method as described later. However, the depth of the recession 37 may be somewhat larger or smaller than the height of the mouse 36. Also, in order that the mouse 36 can be easily taken out or put in and that the mouse 36 is steady in the recession 37, the shape and size of the opening of the recession 37 are made nearly equal to those of the mouse 36.

As shown in FIG. 22, if the mouse 36 is housed completely in the above-described recession 37, it never disturbs the copying operation using no mouse 36. Furthermore by taking out and putting the expansion cord 38 through the bottom part of the recession 37, the space for the cord 38 can be saved, and the size of the recession 37 can be made minimal, and also the expansion cord 38 can be put out of sight, and thereby a shapely appearance can be achieved.

Furthermore, as illustrated in FIG. 21, by housing the mouse 36 in the recession 37 so that the operating keys 101*a* -101*d* formed on the mouse 36 face sidewards, in other words, the keys 101*a*–101*d* don't face upwards, the operator will never touch these keys 101*a*–101*d* by mistake when using no mouse 36. Therefore, a malfunction due to a careless operation of the keys 101*a*–101*d* of the mouse 36 can be prevented.

Figure 23:
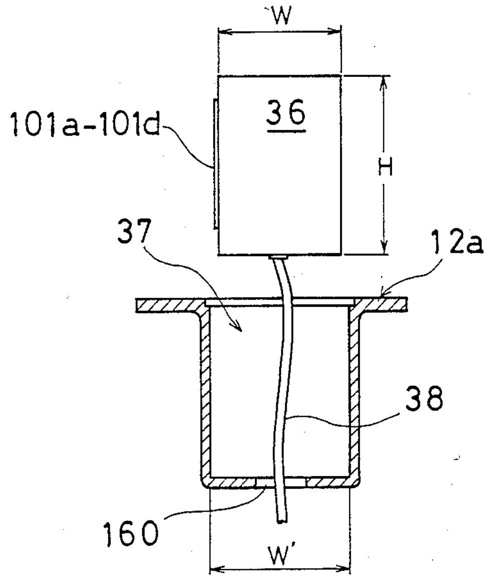
FIG. 23 is an illustrative view showing a dimensional relationship between the mouse and the recession.

To be described in more detail in reference to FIG. 23, taking the width of the mouse 36 as W and the height thereof as H, the relationship between them and the width of the recession 37 W' is selected to be W<"-W'<H. By taking the dimensional relationship in such a manner, because of W'<H, the mouse 36 cannot be housed in the recession 37 in the state that the mouse 36 is rotated by 90° from the state as illustrated in FIG. 23, that is, in the state that the keys 101*a*–101*d* face upwards. Accordingly, the above described misoperation of the keys 101*a*–101*d* in the state that the mouse 36 is housed can be effectively prevented.

Figure 24A:
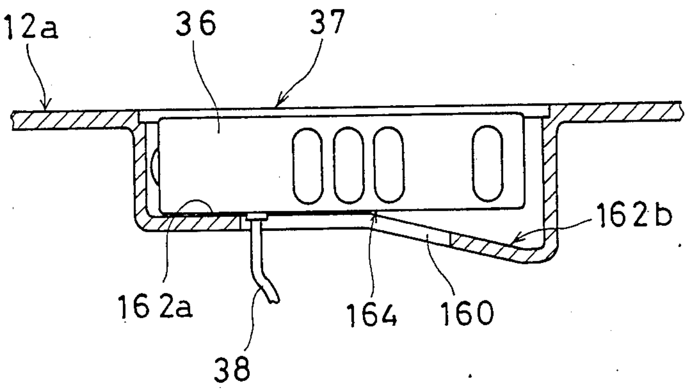
FIG. 24A and FIG. 24B are illustrative view showing a method of taking the mouse out of the recession.

As shown in FIG. 24A, the bottom surface of the recession 37 is formed so as to include a flat part 162*a* and a sinking part 162*b*. A hole 160 of a size having no effect on placing the mouse 36 on the bottom surface is formed ranging from the flat part 162*a* to the sinking part 162*b* of the bottom surface, and the expansion cord 38 can be taken out or put in through this hole 160. In the state that the mouse 36 is housed in the recession 37, the expansion cord 38 is drawn into the main unit 12 through the hole 160, and in the state that the mouse 36 is taken out, the expansion code 38 is drawn out through the hole 160 as illustrated in FIG. 21.

Figure 24B:
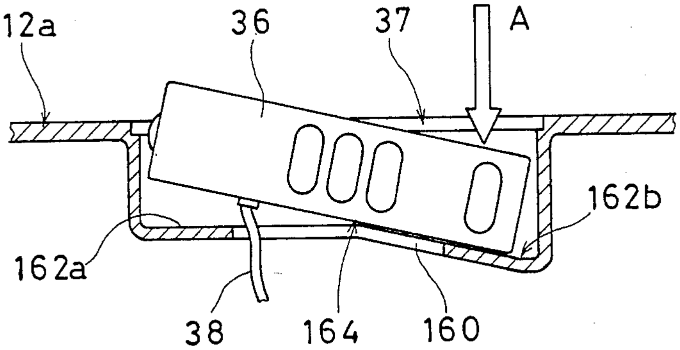

As described above, by forming the flat part 162*a* and the sinking part 162*b* on the bottom surface of the recession 37, the mouse 36 can be simple taken out of the recession 37. To be detailed, as shown in FIG. 24A, the mouse 36 is housed in the recession 37 in a manner that most of the bottom part thereof is in contact with the flat part 162*a* of the bottom surface of the recession 37. When the mouse 36 is taken out, as shown by an arrow in FIG. 24B, the top surface of the mouse 36 is pushed downwards on the sinking part 162*b*. Then, as shown in FIG. 24B, the mouse 36 rotates clockwise with a point 164 of the bottom surface acting as a fulcrum, and the left side end part of the mouse 36 protrudes beyond the opening of the recession 37, that is, the top surface 12*a* of the main unit 12. Accordingly, the operator can easily take the mouse 36 out of the recession 37 only by grasping that protruding part.

In addition, it is needless to say that such a sinking part 162*b* may be formed not only at one end of the recession 37 in the direction of length of the bottom surface but also at the both ends. In this case, to take out the mouse 36, either of the both ends of the mouse 36 has only to be pushed.

Figure 25:
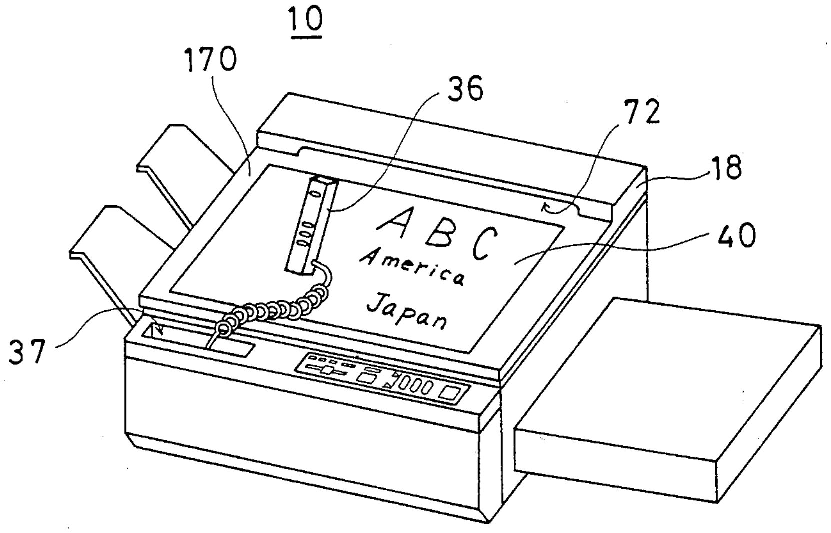
FIG. 25 is a perspective view showing another embodiment in accordance with the present invention.
Figure 26:
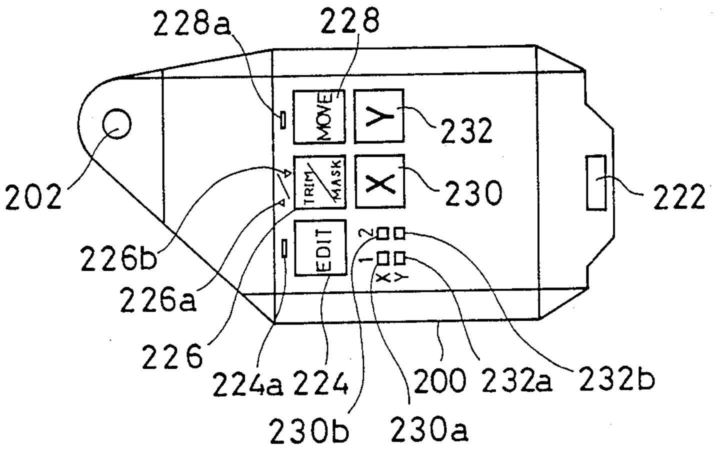
FIG. 26 is an illustrative plan view showing another example of the mouse.

Furthermore, description is made on a preferred example of the original cover 18 in reference to FIG. 25. In the embodiment as illustrated in FIG. 25, a flat plane part 170 having an area larger than the original placing surface of the glass plate 16 (FIG. 1) of the original table 14 is formed on the top surface of the original cover 18. By forming the flat plane part 170 having such a large area on the original cover 18, the original 40 to be edited can be placed on the flat plane part 170, and positional information for editing can be inputted by moving the mouse 36 on the original 40. In other words, by forming the flat plane part 170 of the original cover 18, it is made unnecessary to secure a flat plane of large area at another place to perform the editing work by the mouse 36. If the editing work is performed on the glass plate 16 of the original 14, the positioning plate 20 and the like disturb that work, but when the work is performed on the flat plane part 170, such a disturbance will never take place.

In addition, on the above-described original cover 18, an original storing part 172 may be formed on the top surface thereof. As the case may be the original storing part 172 is made attachable and detachable to and from the original cover 18, and it is removed as required for the editing work to enlarge the area of the flat plane part 170.

Also, the original cover 18 is made desirably of the size which does not cover the recession 37 for housing the mouse 36. Then, the mouse 36 can be taken out even in the state that the original cover 18 is closed.

Figure 27:
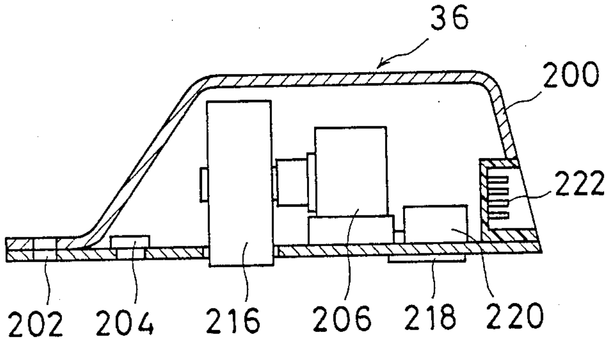
FIG. 27 is an illustrative cross-sectional view showing FIG. 26 embodiment.

Furthermore, the mouse 36 may be of shape as shown in FIG. 25 and FIG. 27. The mouse 36 of this embodiment comprises a box-shaped case 200 which can be held or operated by a single hand, and necessary components are accommodated in this case 200.

A hole 202 for viewing the referential position, for example, the end of the original from above is formed at a part of the protruding part of the side surface of the case 200. Also, a rotary encoder 206 like the one in the previous embodiment is installed in the case 200.

At the right side of the above-described rotary encoder 206, an auxiliary roller 218 is installed which is rotated in a manner that part of the peripheral side surface thereof protrudes downwards beyond the case 200 likewise a rubber roller 216. The auxiliary roller 218 regulates the direction of movement of the mouse 36 in cooperation with the rubber roller 216 so that the mouse 36 can go straight on the original 40 in editing.

On the top surface of the case 200 of the mouse 36, various operating keys 224–230 and LEDs 224*a*–232*b* indicating operations of those keys are mounted. The edit key 224 is used when the original 40 is edited using the mouse 36. When the edit key 224 is operated, the LED 224*a* is lighted. The trimming/masking key 226 and the moving key 228 which are operated after an operation of the edit key 224 are keys for selecting the mode in which the mouse 36 is to be used. Above the trimming/ masking key 226 and the moving key 228, the LEDs 226*a*–228*a* indicating operations of the corresponding keys are mounted respectively. For example, when the trimming/masking key 226 is operated twice after an operation of the edit key 224, the LED 226*a* is lightened and the "masking" mode is set.

Under the trimming/masking key 226 and the moving key 228, the X key 230 and the Y key 232 for respectively setting the X-ordinate and the Y-ordinate of editing are mounted. Under the edit key 224, four (4) LEDs 230*a*, 230*b*, 232*a*, and 232*b* indicating that respective X-ordinates and Y-ordinates of two points have been set by the X key 230 and the Y key 232 are mounted. The LEDs 230a–232b are lightened when the mouse 36 is used in the "trimming" or the "masking" mode. In this embodiment, the area to be trimmed or masked is specified by a quadrilateral having two points as diagonal points. Then, the LEDs 230a and 232a are lightened when the coordinates of one point are inputted and the LEDs 230b and 232b are lightened when the coordinates of two points are inputted, respectively.

When the "moving" mode is set, first the edit key 224 is operated, and subsequently the moving key 228 is operated and the lightening of the LED 228 is made sure, and thereafter the mouse 36 is moved to a required position, and the X key 230 and the Y key 232 are operated. Then, the LEDs 230a–232b are lightened, and the data of coordinates for the movement according to the movement of the mouse 36 is set.

When "moving" is used together with "trimming" or "masking", they are for trimming or masking is specified, and thereafter the "moving" is set by the moving key 228. At this time, the LEDs 230–232b have been already lightened by setting the "trimming" or the "masking" mode, and therefore the lightened state is not changed even if the X key 230 and the Y key 232 are operated after the moving key 228 has been operated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrophotographic copying machine having an editorial function, comprising position specifying means for specifying positions on a surface of an original to be edited by being moved while contacting with the surface of said original, image forming means for forming a copied image of said original being edited according to positional data based on an amount of movement of said position specifying means, said image forming means includes a photoreceptor for forming an electrostatic latent image thereon, and working means for working said electrostatic latent image based on positional data from said position specifying means, said position specifying means includes a rotor rotated with movement of said position specifying means on said original and positional data generating means for generating positional data responding to an amount of rotation of said rotor, said position specifying means further includes a pulse generator generating pulses attending on rotation of said rotor, and said positional data generating means including counting means for counting pulses generated by said pulse generator and generating counted value as said positional data.

2. An electrophotographic copying machine having an editorial function in accordance with claim 1, wherein said position specifying means includes a case which can be grasped by a single hand, and said rotor includes a roller fixed rotatably in said case so that at least a part of a peripheral side surface of said rotor is exposed.

3. An electrophotographic copying machine having an editorial function in accordance with claim 2, wherein said roller includes a peripheral side surface having a relatively large width which contacts with the surface of the original so as to move nearly in a linear fashion on said surface of the original.

4. An electrophotographic copying machine having an editorial function in accordance with claim 1, wherein said image forming means includes controlling means for controlling an image forming process, further comprising an operating switch which is operated when said position specifying means is moved to a position on the surface of the original to be edited from the end of the original to apply said positional data to said controlling means.

5. An electrophotographic copying machine having an editorial function in accordance with claim 4, wherein said position specifying means includes a case which can be grasped by hand, and said operating switch is mounted on said case.

6. An electrophotographic copying machine having an editorial function in accordance with claim 4, wherein two positional data from the end of the original are obtained by operating said operating switch twice while said position specifying means is moved on the surface of the original.

7. An electrophotographic copying machine having an editorial function in accordance with claim 1, wherein said position specifying means includes a case which can be grasped by hand, said position specifying means further comprising a recess capable of accommodating said case therein and a cord withdrawn from an opening formed at a bottom of said recess.

8. An electrophotographic copying machine having an editorial function in accordance with claim 7, wherein said recess has a bottom surface whose one end is formed deeper than the other portion thereof.

9. An electrophotographic copying machine having an editorial function in accordance with claim 1, wherein said working means includes a partially erasing means for partially erasing charges on said photoreceptor.

10. An electrophotographic copying machine having an editorial function in accordance with claim 9, wherein said partially erasing means includes a plurality of light emitting elements arranged in the direction of width of said photoreceptor with a predetermined, further comprising means for selectively lighting or putting out said plurality of light emitting elements in accordance with said positional data.

11. An electrophotographic copying machine having an editorial function in accordance with claim 1, further comprising an original table including a transparent glass plate for putting said original thereon and an original table cover for covering said original table in a manner capable of opening and closing, wherein a flat plane having an area larger than that of said transparent glass plate is formed on said original table cover, and thereby specifying of position on the surface of said original by said position specifying means can be performed on said flat plane.

12. An electrophotographic copying machine having an editorial function, comprising position specifying means for specifying positions on a surface of an original to be edited by being moved while contacting with the surface of said original, and image forming means for forming a copied image of said original being edited according to positional data based on an amount of movement of said position specifying means, said position specifying means includes a rotor rotated with movement of said position specifying means on said original and positional data generating means for generating positional data responding to an amount of rotation of said rotor, said position specifying means further including a pulse generator generating pulses attending on rotation of said rotor, said positional data generating means including counting means for counting pulses generated by said pulse generator and generating counted value as said positional data, said copying machine further comprising direction discriminating means for discriminating a rotation direction of said rotor, wherein said counting means includes reversible counter incremented or decremented in response to the discriminated direction, and thereby positional data according to a direction of movement of said position specifying means can be generated.

13. An electrophotographic copying machine having an editorial function in accordance with claim 12, wherein said rotation detecting means includes a rotary shaft journaling said roller, a disc on which a portion to be detected is formed, said disc being connected to said rotary shaft, and a sensor detecting said portion to be detected of said disc.

14. An electrophotographic copying machine having an editorial function, comprising position specifying means for specifying positions on a surface of an original to be edited by being moved while contacting with the surface of said original, image forming means for forming a copied image of said original being edited according to positional data based on an amount of movement of said position specifying means, said position specifying means including a rotor rotated with movement of said position specifying means on said original and positional data generating means for generating positional data responding to an amount of rotation of said rotor, said position specifying means further including a case which can be grasped by a single hand, and said rotor includes a roller fixed rotatably in said case so that at least a part of a peripheral side surface of said rotor is exposed, wherein a recession is formed in said roller and rotation detecting means is disposed in said recession of said roller for detecting rotation of said roller.

15. An electrophotographic copying machine having an editorial function, comprising position specifying means for specifying positions on a surface of an original to be edited by being moved while contacting with the surface of said original, image forming means for forming a copied image of said original being edited according to positional data based on an amount of movement of said position specifying means, said image forming means including controlling means for controlling an image forming process and further comprising an operating switch operated when said position specifying means is moved to a position on the surface of the original to be edited from the end of the original to apply said positional data to said controlling means, wherein at least two positional data from the end of the original are obtained by operating said operating switch twice while said position specifying means is moved on the surface of the original.

16. An electrophotographic copying machine having an editorial functional in accordance with claim 15, wherein a first positional data from the end of the original is obtained by depressing said operating switch once and a second positional data is obtained by releasing said depressing respectively, while said position specifying means is moved on the surface of the original.

17. An electrophotographic copying machine having an editorial function in accordance with claim 16, wherein said controlling means includes an area specifying means for specifying an area defined by orthogonal straight lines based on said positional data from the positional data generating means while said position specifying means is moved in two orthogonal directions on the surface of the original, and trimming means for trimming an image in said area specified by said area specifying means.

18. An electrophotographic copying machine having an editorial function in accordance with claim 16, wherein said controlling means includes area specifying means for specifying an area defined by orthogonal straight lines based on said positional data from the positional data generating means while said position specifying means is moved in two orthogonal directions on the surface of the original, and masking means for masking an image in said area specified by said area specifying means.

19. An electrophotographic copying machine having an editorial function, comprising position specifying means for specifying positions on a surface of an original to be edited by being moved while contacting with the surface of said original, image forming means for forming a copied image of said original being edited according to positional data based on an amount of movement of said position specifying means, said position specifying means including a rotor rotated with movement of said position specifying means on said original and positional data generating means for generating positional data responding to an amount of rotation of said rotor, said position specifying means further including a pulse generator generating pulses attending on rotation of said rotor, and said positional data generating means including counting means for counting pulses generated by said pulse generator and generating counted value as said positional data, said controlling means includes an image moving means for moving an image based on said positional data from the positional data generating means while said position specifying means is moved on the surface of the original, said copying machine further comprising means for discriminating a direction of movement of said position specifying means, wherein said image moving means moves the image in the discriminated direction of said movement.

20. An electrophotographic copying machine having an editorial function in accordance with claim 19, wherein said image forming means includes a photoreceptor for forming an electrostatic latent image thereon, developing means for converting said electrostatic latent image formed on said photoreceptor into a toner image, transferring means for transferring said toner image onto a paper, and timing controlling means for controlling a timing of transfer by said transferring means in accordance with positional data from said position specifying means.

21. An electrophotographic copying machine having an editorial function in accordance with claim 20, wherein said timing controlling means includes means for controlling timing of feeding the paper to said transferring means.

22. An electrophotographic copying machine having an editorial function, comprising position specifying means for specifying positions on a surface of an original to be edited by being moved while contacting with the surface of said original, image forming means for forming a copied image of said original being edited according to positional data based on an amount of movement of said position specifying means from the edge of the original, said image forming means including a photoreceptor for forming an electrostatic latent image thereon, and working means for working said electrostatic latent image based on positional data from said position specifying means, said position specifying means including a rotor rotated with movement of said position specifying means on said original and positional data generating means for generating positional data responding to an amount of rotation of said rotor, said position specifying means further including a pulse generator generating pulses attending on rotation of said rotor, and said positional data generating means including counting means for counting pulses generated by said pulse generator and generating counted value as said positional data.

* * * * *